United States Patent
Jain et al.

(10) Patent No.: US 11,487,531 B2
(45) Date of Patent: *Nov. 1, 2022

(54) CUSTOMIZING APPLICATIONS FOR HEALTH MONITORING USING RULES AND PROGRAM DATA

(71) Applicant: Vignet Incorporated, Fairfax, VA (US)

(72) Inventors: Praduman Jain, Fairfax, VA (US); Dave Klein, Oakton, VA (US); Yue Cao, Vienna, VA (US); Neeta Jain, Fairfax, VA (US)

(73) Assignee: VigNet Incorporated, Fairfax, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/037,898

(22) Filed: Sep. 30, 2020

(65) Prior Publication Data
US 2021/0026626 A1 Jan. 28, 2021

Related U.S. Application Data

(63) Continuation of application No. 16/702,631, filed on Dec. 4, 2019, now Pat. No. 11,321,082, which is a
(Continued)

(51) Int. Cl.
*G06F 8/71* (2018.01)
*G06F 3/04847* (2022.01)
(Continued)

(52) U.S. Cl.
CPC .............. *G06F 8/71* (2013.01); *G06F 3/0481* (2013.01); *G06F 3/0482* (2013.01);
(Continued)

(58) Field of Classification Search
CPC ......... H04L 67/22; H04L 67/34; H04L 67/42; H04L 67/1002; H04L 41/08; H04L 43/00;
(Continued)

(56) References Cited

U.S. PATENT DOCUMENTS 5,545,186 A * 8/1996 Olson .................... A61B 5/363
607/9
6,039,688 A 3/2000 Douglas et al.
(Continued)

FOREIGN PATENT DOCUMENTS

EP 2545468 1/2016
WO WO 2011/112556 9/2011

OTHER PUBLICATIONS

[No Author] "Methods for JIT Ais Just in Time Adaptive Intervention," 2016, Nov. 9, 2016, [retreieved on Nov. 9, 2016], from the internet <https://community.isr.umich.edu/public/Default.aspx?alias=community.isr.umich.edu/public/jitai&>.
(Continued)

*Primary Examiner* — James N Fiorillo
(74) *Attorney, Agent, or Firm* — Fish & Richardson P.C.

(57) ABSTRACT

In some implementations, a system enables an administrator to customize a set of rules to dynamically adjust the configuration and output of an application provided to users. A configuration interface for setting rules that dynamically adjust output of an application is provided. Data indicating one or more rules are received through the configuration interface. Activity data indicating user interaction with the application or sensor data for at least some of a plurality of users of the application are then received from multiple client devices. A determination relating to the activity data satisfying at least one condition or trigger is then made. Instructions to adjust output of the application according to one or more system actions of the one or more rules are then communicated to client devices associated with the users in the first subset of the plurality of users.

25 Claims, 8 Drawing Sheets

Related U.S. Application Data continuation of application No. 15/841,540, filed on Dec. 14, 2017, now Pat. No. 10,587,729, which is a continuation of application No. 15/337,222, filed on Oct. 28, 2016, now Pat. No. 9,848,061.

(51) Int. Cl.
*G06F 3/0482* (2013.01)
*G06F 9/445* (2018.01)
*G06F 9/451* (2018.01)
*G06F 3/0481* (2022.01)
*G06F 8/65* (2018.01)
*H04L 67/00* (2022.01)
*H04L 67/01* (2022.01)
*H04L 67/50* (2022.01)

(52) U.S. Cl.
CPC ............ *G06F 3/04847* (2013.01); *G06F 8/65* (2013.01); *G06F 9/44505* (2013.01); *G06F 9/451* (2018.02); *H04L 67/01* (2022.05); *H04L 67/34* (2013.01); *H04L 67/535* (2022.05)

(58) Field of Classification Search
CPC . H04L 29/06; H04L 29/08; G06F 8/65; G06F 8/71; G06F 21/57; G06F 3/0481; G06F 3/0482; G06F 3/0484; G06F 3/04847; G06F 9/445; G06F 9/451; G06F 9/4416; G06F 9/44505; G06F 11/34; G06Q 30/00; G16H 40/20; G16H 40/63
USPC ........................................................ 709/205
See application file for complete search history.

(56) References Cited

U.S. PATENT DOCUMENTS

| | | |
|---|---|---|
| 6,260,022 B1 | 7/2001 | Brown |
| 6,269,339 B1 | 7/2001 | Silver |
| 6,907,375 B2 | 6/2005 | Guggari |
| 7,076,534 B1 | 7/2006 | Cleron et al. |
| 7,330,717 B2 | 2/2008 | Gidron et al. |
| 7,447,643 B1 | 11/2008 | Olson et al. |
| 7,827,478 B2 | 11/2010 | Farr et al. |
| 7,827,495 B2 | 11/2010 | Bells et al. |
| 7,935,613 B2 | 5/2011 | Gizewski |
| 8,060,553 B2 | 11/2011 | Mamou |
| 8,078,956 B1 | 12/2011 | Feldman |
| 8,347,263 B1 | 1/2013 | Offer |
| 8,849,610 B2 | 9/2014 | Molettiere |
| 8,850,304 B2 | 9/2014 | Ye et al. |
| 8,997,038 B2 | 3/2015 | Becker |
| 9,134,964 B2 | 9/2015 | Hirsch |
| 9,170,800 B2 | 10/2015 | Lang |
| 9,203,911 B2 | 12/2015 | Krislmaswamy et al. |
| 9,256,698 B2 | 2/2016 | Vincent, III |
| 9,361,011 B1 | 6/2016 | Burns |
| 9,426,433 B1 | 8/2016 | Mazzarella |
| 9,461,972 B1* | 10/2016 | Mehta .................. H04L 63/0435 |
| 9,715,370 B2 | 7/2017 | Friedman |
| 9,753,618 B1 | 9/2017 | Jain |
| 9,844,725 B1* | 12/2017 | Durkin ................ G06Q 30/0601 |
| 9,848,061 B1 | 12/2017 | Jain et al. |
| 9,858,063 B2 | 1/2018 | Jain et al. |
| 9,928,230 B1 | 3/2018 | Jain et al. |
| 9,983,775 B2 | 5/2018 | Jain et al. |
| 10,055,745 B2 | 8/2018 | Carlson et al. |
| 10,069,934 B2 | 9/2018 | Jain et al. |
| 10,095,688 B1 | 10/2018 | Jain et al. |
| 10,521,557 B2 | 12/2019 | Jain et al. |
| 10,565,894 B1 | 2/2020 | Jain et al. |
| 10,756,957 B2 | 8/2020 | Jain et al. |
| 10,762,990 B1 | 9/2020 | Jain et al. |
| 10,938,651 B2 | 3/2021 | Jain et al. |
| 11,056,242 B1 | 7/2021 | Jain et al. |
| 11,061,798 B1 | 7/2021 | Jain et al. |
| 11,082,487 B1 | 8/2021 | Jain et al. |
| 11,102,304 B1 | 8/2021 | Jain et al. |
| 2001/0019338 A1 | 9/2001 | Roth |
| 2002/0022973 A1 | 2/2002 | Sun |
| 2002/0035486 A1 | 3/2002 | Huyn et al. |
| 2004/0073868 A1 | 4/2004 | Easter et al. |
| 2004/0203755 A1 | 10/2004 | Brunet et al. |
| 2005/0086587 A1 | 4/2005 | Balz |
| 2005/0186550 A1 | 8/2005 | Gillani |
| 2005/0246304 A1 | 11/2005 | Knight et al. |
| 2006/0041452 A1 | 2/2006 | Kukami |
| 2006/0107219 A1 | 5/2006 | Ahya |
| 2006/0184493 A1 | 8/2006 | Schiffman et al. |
| 2006/0205564 A1* | 9/2006 | Peterson ................ A63B 69/00 482/8 |
| 2006/0206861 A1* | 9/2006 | Shenfield ................ G06F 8/35 717/106 |
| 2006/0282516 A1 | 12/2006 | Taylor |
| 2007/0021984 A1 | 1/2007 | Brown |
| 2007/0033273 A1 | 2/2007 | White |
| 2007/0281285 A1 | 12/2007 | Jayaweera |
| 2008/0005679 A1 | 1/2008 | Rimas-Ribikauskas |
| 2008/0126110 A1 | 5/2008 | Haeberle |
| 2008/0127040 A1 | 5/2008 | Barcellona |
| 2008/0242221 A1 | 10/2008 | Shapiro et al. |
| 2008/0243038 A1 | 10/2008 | Bennett |
| 2008/0254429 A1 | 10/2008 | Woolf et al. |
| 2008/0261191 A1* | 10/2008 | Woolf ..................... G09B 7/00 434/323 |
| 2008/0311968 A1 | 12/2008 | Hunter |
| 2009/0023555 A1 | 1/2009 | Raymond |
| 2009/0024944 A1 | 1/2009 | Touch |
| 2009/0035733 A1* | 2/2009 | Meitar ..................... G09B 7/00 434/118 |
| 2009/0043689 A1 | 2/2009 | Yang |
| 2009/0076856 A1* | 3/2009 | Darby ..................... G09B 23/28 705/2 |
| 2009/0094052 A1 | 4/2009 | James et al. |
| 2009/0119678 A1 | 5/2009 | Shih |
| 2009/0156190 A1 | 6/2009 | Fisher |
| 2009/0163182 A1 | 6/2009 | Gatti |
| 2009/0164474 A1 | 6/2009 | Noumeir |
| 2009/0172002 A1 | 7/2009 | Bathiche |
| 2009/0276771 A1* | 11/2009 | Nickolov ............. H04L 67/1008 718/1 |
| 2010/0041378 A1 | 2/2010 | Aceves |
| 2010/0082367 A1 | 4/2010 | Hains et al. |
| 2010/0179833 A1 | 7/2010 | Roizen et al. |
| 2010/0211941 A1 | 8/2010 | Roseborough |
| 2010/0262664 A1* | 10/2010 | Brown ................... H04W 28/12 709/206 |
| 2011/0173308 A1* | 7/2011 | Gutekunst ........... G06F 21/6245 709/222 |
| 2011/0184748 A1 | 7/2011 | Fierro et al. |
| 2011/0200979 A1 | 8/2011 | Benson |
| 2011/0218407 A1 | 9/2011 | Haberman |
| 2011/0307331 A1* | 12/2011 | Richard ................ G06F 16/951 707/E17.108 |
| 2012/0036220 A1* | 2/2012 | Dare ....................... H04L 67/04 709/217 |
| 2012/0084848 A1 | 4/2012 | Kim |
| 2012/0102050 A1 | 4/2012 | Button |
| 2012/0266251 A1* | 10/2012 | Birtwhistle ........... H04W 12/50 726/26 |
| 2012/0272156 A1 | 10/2012 | Kerger |
| 2013/0060922 A1* | 3/2013 | Koponen .............. H04L 49/1546 709/223 |
| 2013/0085858 A1 | 4/2013 | Sim et al. |
| 2013/0110565 A1 | 5/2013 | Means |
| 2013/0151710 A1* | 6/2013 | D'souza ................ H04M 15/66 709/226 |
| 2013/0166494 A1 | 6/2013 | Davis |
| 2013/0173413 A1* | 7/2013 | Page ..................... G06Q 30/00 705/26.5 |
| 2013/0179472 A1 | 7/2013 | Junqua |
| 2013/0238686 A1 | 9/2013 | O'Donoghue |

(56) References Cited

U.S. PATENT DOCUMENTS

| | | | |
|---|---|---|---|
| 2013/0283188 A1 | 10/2013 | Sanghvi | |
| 2013/0329632 A1* | 12/2013 | Buyukkoc | H04L 47/12 370/328 |
| 2014/0026113 A1 | 1/2014 | Farooqi | |
| 2014/0033171 A1 | 1/2014 | Lorenz | |
| 2014/0068006 A1 | 3/2014 | Singhal | |
| 2014/0088995 A1 | 3/2014 | Damani | |
| 2014/0100883 A1 | 4/2014 | Hamilton | |
| 2014/0101628 A1 | 4/2014 | Almog | |
| 2014/0109072 A1 | 4/2014 | Zhongmin et al. | |
| 2014/0109115 A1 | 4/2014 | Low | |
| 2014/0109177 A1 | 4/2014 | Barton et al. | |
| 2014/0156823 A1 | 6/2014 | Liu | |
| 2014/0173405 A1 | 6/2014 | Ferrara et al. | |
| 2014/0181715 A1 | 6/2014 | Axelrod | |
| 2014/0240122 A1 | 8/2014 | Roberts | |
| 2014/0257058 A1* | 9/2014 | Clarysse | A61B 5/7275 600/301 |
| 2014/0258827 A1 | 9/2014 | Gormish et al. | |
| 2014/0273913 A1 | 9/2014 | Michel | |
| 2014/0278536 A1 | 9/2014 | Zhang | |
| 2015/0019342 A1 | 1/2015 | Gupta | |
| 2015/0025917 A1* | 1/2015 | Stempora | G06Q 40/08 705/4 |
| 2015/0025997 A1* | 1/2015 | Tilenius | G06F 16/90324 705/26.7 |
| 2015/0056589 A1 | 2/2015 | Zhang et al. | |
| 2015/0074635 A1 | 3/2015 | Margiotta | |
| 2015/0089224 A1 | 3/2015 | Beckman | |
| 2015/0135160 A1 | 5/2015 | Gauvin | |
| 2015/0143470 A1* | 5/2015 | Stiekes | H04L 63/10 726/4 |
| 2015/0148061 A1 | 5/2015 | Koukoumidis | |
| 2015/0149390 A1 | 5/2015 | Brdiczka et al. | |
| 2015/0163121 A1 | 6/2015 | Mahaffey | |
| 2015/0199490 A1* | 7/2015 | Iancu | G16H 40/67 705/2 |
| 2015/0220233 A1 | 8/2015 | Kok et al. | |
| 2015/0294090 A1 | 10/2015 | Kodiyan | |
| 2015/0370228 A1 | 12/2015 | Kohn | |
| 2016/0021040 A1* | 1/2016 | Frei | G05B 15/02 709/224 |
| 2016/0058287 A1 | 3/2016 | Dyell | |
| 2016/0092339 A1 | 3/2016 | Straub | |
| 2016/0217118 A1 | 7/2016 | Singh et al. | |
| 2016/0261425 A1 | 9/2016 | Horton | |
| 2017/0000422 A1 | 1/2017 | Moturu et al. | |
| 2017/0039324 A1 | 2/2017 | Francois et al. | |
| 2017/0048215 A1 | 2/2017 | Straub | |
| 2017/0068006 A1 | 3/2017 | Forgues et al. | |
| 2017/0083837 A1 | 3/2017 | Berlandier | |
| 2017/0124276 A1* | 5/2017 | Tee | G06F 21/6245 |
| 2017/0132395 A1* | 5/2017 | Futch | G06Q 40/08 |
| 2017/0201425 A1 | 7/2017 | Marinelli | |
| 2017/0286389 A1 | 10/2017 | Ceneviva | |
| 2017/0286605 A1* | 10/2017 | Wong | H04L 41/082 |
| 2017/0303187 A1* | 10/2017 | Crouthamel | H04B 1/713 |
| 2017/0323064 A1* | 11/2017 | Bates | G16H 50/20 |
| 2017/0330297 A1* | 11/2017 | Cronin | A61B 5/6802 |
| 2017/0358242 A1* | 12/2017 | Thompson | G06Q 10/0639 |
| 2017/0372442 A1* | 12/2017 | Mejias | G16H 40/20 |
| 2018/0089159 A1 | 3/2018 | Jain et al. | |
| 2018/0108272 A1 | 4/2018 | Ahmad et al. | |
| 2018/0121187 A1 | 5/2018 | Jain et al. | |
| 2018/0176331 A1 | 6/2018 | Jain et al. | |
| 2018/0197624 A1* | 7/2018 | Robaina | A61B 5/1176 |
| 2018/0210870 A1 | 7/2018 | Jain et al. | |
| 2018/0277243 A1* | 9/2018 | Qing | G16H 40/63 |
| 2018/0341378 A1* | 11/2018 | Morrow | G06F 3/0484 |
| 2019/0002982 A1* | 1/2019 | Wang | G16B 20/00 |
| 2019/0043619 A1* | 2/2019 | Vaughan | G06N 20/00 |
| 2019/0198172 A1* | 6/2019 | Nelson, Jr. | G16H 50/30 |
| 2019/0201123 A1* | 7/2019 | Shelton, IV | A61B 90/37 |
| 2019/0320310 A1* | 10/2019 | Horelik | H04W 68/005 |
| 2020/0082918 A1* | 3/2020 | Simhon | G16H 20/00 |
| 2020/0131581 A1 | 4/2020 | Jain et al. | |
| 2020/0203012 A1 | 6/2020 | Kamath et al. | |
| 2020/0267110 A1 | 8/2020 | Nolan et al. | |
| 2020/0364588 A1* | 11/2020 | Knox | H04L 67/565 |
| 2021/0026626 A1* | 1/2021 | Jain | G06F 3/0482 |
| 2021/0050105 A1* | 2/2021 | Randhawa | G16H 40/67 |

OTHER PUBLICATIONS

Airwatch: "AirWatch Enterprise Mobility Management Demo," youtube, Jul. 22, 2014, retrieved from the Internet <https://www.youtube.com/watch?v=ucV1n4-tgk>, retrieved on May 3, 2017, 1 page.

Airwatch: "Airwatch laptop management demo," youtube, Oct. 3, 2014, retrieved from the Internet <https://www.youtube.com/watch?v=3gHfmdVZECM>, retrieved on May 3, 2017, 1 page.

Conner, "Experience sampling and ecological momentary assessment with mobile phones," 2015—http://www.otago.ac.nz/psychology/otago047475.pdf.

Henze et al., Push the study to the App store: evaluating off-screen visualizations for maps in the android market, Sep. 2010, 2 pages.

Heron, "Ecological Momentary Intervention [EMI]: Incorporating mobile technology into a disordered eating treatment program for college women," Psychology—Dissertations, paper 157, 2011.

http://www.khanacademic.org, 2017, 1 page.

Milward, "Ecological momentary assessment," Jul. 2015, [retrieved on May 12, 2017], from the internet <https://www.addiction-ssa.org/commentary/emerging-research-methods-series-ecological-momentary-assessment>, 3 pages.

Runyan et al., "Virtues, ecological momentary assessment/intervention and smartphone technology," Front Psychol, 2015;6:481.

Schilit et al., Context-aware computing applications. InMobile Computing systems and Applications, 1994, Proceedings., Workshop on Dec. 8, 1994 (pp. 85-90).

Taivan et al., Application Diversity in Open Display Networks, Jun. 2014, 6 pages.

Non Final Office Action in U.S. Appl. No. 16/702,631, dated Apr. 16, 2021, 48 pages.

Notice of Allowance in U.S. Appl. No. 16/702,631, dated Dec. 22, 2021, 24 pages.

Final Office Action in U.S. Appl. No. 17/076,056, dated Jan. 21, 2022, 38 pages.

Non-Final Office Action in U.S. Appl. No. 17/244,131, dated Jan. 19, 2022, 30 pages.

* cited by examiner

CUSTOMIZING APPLICATIONS FOR HEALTH MONITORING USING RULES AND PROGRAM DATA

CROSS-REFERENCE TO RELATED APPLICATIONS

This application is a continuation of U.S. patent application Ser. No. 16/702,631, filed Dec. 4, 2019, now pending, which is a continuation of U.S. patent application Ser. No. 15/841,540, filed Dec. 14, 2017, now U.S. Pat. No. 10,587,729, which is a continuation of U.S. patent application Ser. No. 15/337,222, filed Oct. 28, 2016, now U.S. Pat. No. 9,848,061. The entire contents of each of the previous applications is incorporated herein by reference.

GOVERNMENT LICENSE RIGHTS

This invention was made with government support under grant number HHSN261201300056C awarded by the National Institutes of Health. The government has certain rights in the invention.

FIELD

This specification generally describes technology related to applications for computing devices.

BACKGROUND

Applications for computers, mobile devices, and other devices can provide useful functionality to users. Users generally install and run many different applications, each with a different purpose and set of functionality. Frequently, applications are coded and maintained separately, at considerable effort and cost. Applications are often individually stored and distributed through application store or marketplace, requiring significant server resources for distribution and storage. Further, user devices have limited storage space. This limited space is often consumed by applications that are each useful for only limited functions, or by applications that each only partially serve the user's needs.

Many applications operate using a series of fixed set of software updates to provide users with updated features and/or adjustments to improve a user's experience on the application. For example, after a user installs an application, subsequent updates to the application such as content provided on the application, interactivity settings related to the user interface of the application, or arrangement of content provided on the user interface, often require manual installation of software updates.

SUMMARY

In some implementations, a system enables an administrator to customize a set of rules to dynamically adjust the configuration and output of an application provided to users. The rules may include combinations of triggers, evaluation conditions, and system actions, so that satisfying appropriate triggers or evaluation conditions results in the execution of the corresponding system actions. The rules can be configured by the administrator prior to the start of a user engagement program provided through the application, and then subsequently adjusted by the administrator during the user's participation in the program. Adjustments to rules by the administrators can be made in real-time to adapt to and/or accommodate the interaction of users with the application.

In this regard, configuration of the rules allows for the creation of various programs available through a single application, where the programs can be applicable for a large user population. Although general sets of rules may apply to many different users, the outcome of the rules can use the context of each user in determining which content and interactions to provide, resulting in a personalized experience tailored for each user even when using the same rule set.

The system includes a decision engine module that periodically processes or evaluates a set of rules configured by the administrator for a program based on data submitted by users while participating in the program. For instance, in response to determining that a trigger and evaluation condition associated with a rule is satisfied, the decision engine module may then execute a set of system actions specified by the rule due to a user's performance on the program. In other instances, the administrator may reconfigure an existing rule, or add a new rule, during the user's participation in the program, which then automatically adjusts the evaluation techniques used by the decision engine module to evaluate the set of rules associated with the program. In this regard, the system provides a dual feedback mechanism, allowing dynamic reconfiguration of an application based on both the input provided by the administrator and input provided by the user.

The selection of the set of rules enables an administrator to control various aspects of the program in a modular fashion. In some instances, different rules may provide complementary configuration settings that are then evaluated in aggregate by the decision engine module. For example, a first rule may specify evaluation conditions for milestones associated with a user's performance within the program, whereas a second complementary rule may specify types of content to be provided to the user in response to a determination that the conditions for the first rule have been satisfied. The administrator may customize a particular group of rules for a particular program to target specific sets of users based on a set of factors associated with the program (e.g., user type, medical treatment type, medical conditions, etc.). In addition, the administrator may further customize the triggers and/or evaluations conditions specified for each rule within a group in order to adjust the evaluation techniques used by the decision engine module. The assignment of rules to groups, programs, and/or user types can enhance the efficiency of the decision engine module. For example, rather than processing the full set of rules for each user, the system can quickly filter the rules to a customized subset of rules applicable to each respective user. This filtering increases responsiveness of the platform and decreases the amount of computation required to support large sets of users.

The system also enables an administrator, such as a healthcare provider or insurer, to monitor the ongoing activity of users and adjust the triggers and conditions of the set of rules to provide content that is directed to increasing the likelihood that users will complete the program or achieve a desired outcome. In this regard, the system can be used as a content delivery platform to a variety of users using different programs that supply different content and user experiences, and also personalize each program for each individual user. As rule sets are used over time, the system can assess the effectiveness of individual rules and combinations of rules in maintaining user engagement and achieving desired outcomes. Through analysis of user inputs and user behavior, e.g., as detected with sensors of user devices, the system can determine which rule components, rules, and/or combinations thereof are correlated with successful outcomes for users. The system can then provide an administrator with suggested new rules, or suggested changes to existing rules, that are determined to improve user engagement and user outcomes.

The architecture of the system provides various improvements in dynamically adjusting output of a program to individual users, which often requires significant computing and storage resources on server systems. For example, in order to generate customized interactions with individual users, server systems often require storage of different application configurations and associated files for implementing the different configurations on individual client devices. The architecture of the present system, however, utilizes a decision engine module that processes a set of rules that configure a program based on specifications of triggers, evaluation conditions, and system actions associated with individual rules, or the composition of a collection of rules that interact with each other to configure a program. For instance, use of the decision engine module reduces the number of manual actions necessary to generate a large number of variations of a particular program. As described below, the architecture can automate system actions based on the satisfaction of triggers and evaluation conditions specified by rules associated with the particular program.

In addition, the architecture of the system enables the system to address various problems that arise in the networked environment of server-based applications. As an example, application configurations that are provided to client devices by servers are often static for significant periods of time and may require major updates to application code for configuration changes to apply. This can be time consuming for application developers and for end-users since it requires periodic manual reconfiguration of applications, and periodic delivery of the reconfigured applications. As described in more detail below, the architecture of the system addresses this problem by, among other techniques, employing a rule-based decision engine that uses a collection of hierarchal rules to automatically adjust application configuration with limited developer intervention. Moreover, processing of these rules by the system can automatically and dynamically alter a user's experience with the application without requiring users to manually download application updates.

Further, the implementations discussed below can provide ongoing customization of user experiences in an efficient manner, reducing computation need, power consumption, and other resource requirements. Processing the rules for a large set of users can be done efficiently by limiting processing of rules for a given user to a particular subset of rules applicable to the user. Even for rules in the subset, processing can be limited by using the trigger as a threshold test, so that further processing of the rule is not performed until and unless the trigger is detected.

Another problem that often arises in networked environments is that applications are often unable to provide effective real-time adjustments that are appropriate for a user's particular circumstances. For example, while some applications can process historical data and provide analyses and recommendations, such applications are often unable to dynamically adjust (i) the content that is provided to the user on the application, and (ii) the arrangement specifications of the application (e.g., types and characteristics of interface elements, color schemes used in style specifications, etc.) without requiring a manual application update. As described in more detail below, the architecture of the system can address this problem with, among other techniques, the use of a collection of rules that associates triggers and conditions with actions to be executed by the system. The scope of each rule can be manipulated based on selections of the triggers, conditions, and system actions by an administrator. In this regard, some rules can be applied to make general adjustments (e.g., providing notification badges, or adjusting content provided), whereas other rules can be applied as context-specific changes that respond to user behavior.

In one general aspect, a computer-implemented method includes: providing, by the one or computers, a configuration interface for setting rules that dynamically adjust output of an application provided to a plurality of users, the configuration interface permitting the rules to be specified using combinations of triggers, conditions, and actions; receiving, by the one or more computers through the configuration interface, data indicating one or more rules and, for each of the one or more rules, data that specifies (i) at least one trigger or condition, and (ii) one or more system actions to be performed in response to a satisfaction of the at least one trigger or condition; receiving, by the one or more computers and from multiple client devices, activity data indicating user interaction with the application or sensor data for at least some of the plurality of users of the application; determining, by the one or more computers, that the activity data for a first subset of the plurality of the users satisfies the at least one condition or trigger and that the activity data for a second subset of the plurality of the users does not satisfy the at least one condition or trigger; and communicating, by the one or more computers, with client devices associated with the users in the first subset to adjust output of the application according to the one or more system actions of the one or more rules, while not adjusting the output of the application for the users in the second subset based on the one or more rules.

One or more implementations can include the following optional features. For example, in some implementations, dynamically adjusting the output of the application includes adjusting an arrangement of content specified by the rules, where the content is provided for display at the client devices associated with the users in the first subset of the plurality of the users for which the activity data satisfies the at least one condition or trigger.

In some implementations, the system action specified by the rule includes an action to provide content for display in the application; and communicating with client devices associated with the users in the first subset includes providing, by the one or more computers and to the client devices associated with users in the first subset, the content specified by the rule to the client devices associated with the users in the first subset.

In some implementations, the method includes obtaining, by the one or more computers, data indicating historical information indicating the satisfaction of triggers or conditions over a particular period of time; and providing, on the configuration interface, a user-selectable option on the configuration interface to adjust one or more existing rules.

In some implementations, the method further includes: obtaining, by the one or more computers, data indicating historical information indicating received activity data that has satisfied one or more triggers or conditions over a particular period of time; providing, on the configuration interface, a user-selectable list of preconfigured rules that are identified based on the received activity data; and adding, based on a user selection from the user-selectable list, a particular rule of the preconfigured rules to a program provided through the application.

In some implementations, the application provides access to a plurality of programs that each provide different sets of interactive content through the application; the rules that dynamically adjust output of the application include (i) one or more global rules that are associated with each of the plurality of programs and (ii) one or more program rules associated with only a particular program of the plurality of programs.

In some implementations, the method includes providing, by the one or more computers and for output on the configuration interface, a user-selectable option to: (i) adjust a collection of rules associated with a particular program that includes at least one rule, or (ii) adjust the combination of the triggers, conditions, and actions for the at least one rule.

In some implementations, the configuration interface includes a set of filters that each provide selections of program criteria for a particular program; and providing the configuration interface for setting rules that dynamically adjust output of the application includes providing a user-selectable list of preconfigured rules that are predetermined to associated with the selections of program criteria for the particular program.

In some implementations, the configuration interface is provided to a plurality of administrators that are each associated with a different organization; and the one or more rules are each associated with respective programs provided by the different organizations.

In some implementations, the configuration interface provided to the plurality of administrators is associated with a single application provided to the plurality of users.

The details of one or more implementations are set forth in the accompanying drawings and the description below. Other potential features and advantages will become apparent from the description, the drawings, and the claims.

BRIEF DESCRIPTION OF THE DRAWINGS

In the drawings, like reference numbers represent corresponding parts throughout.

DETAILED DESCRIPTION

Figure 1A:
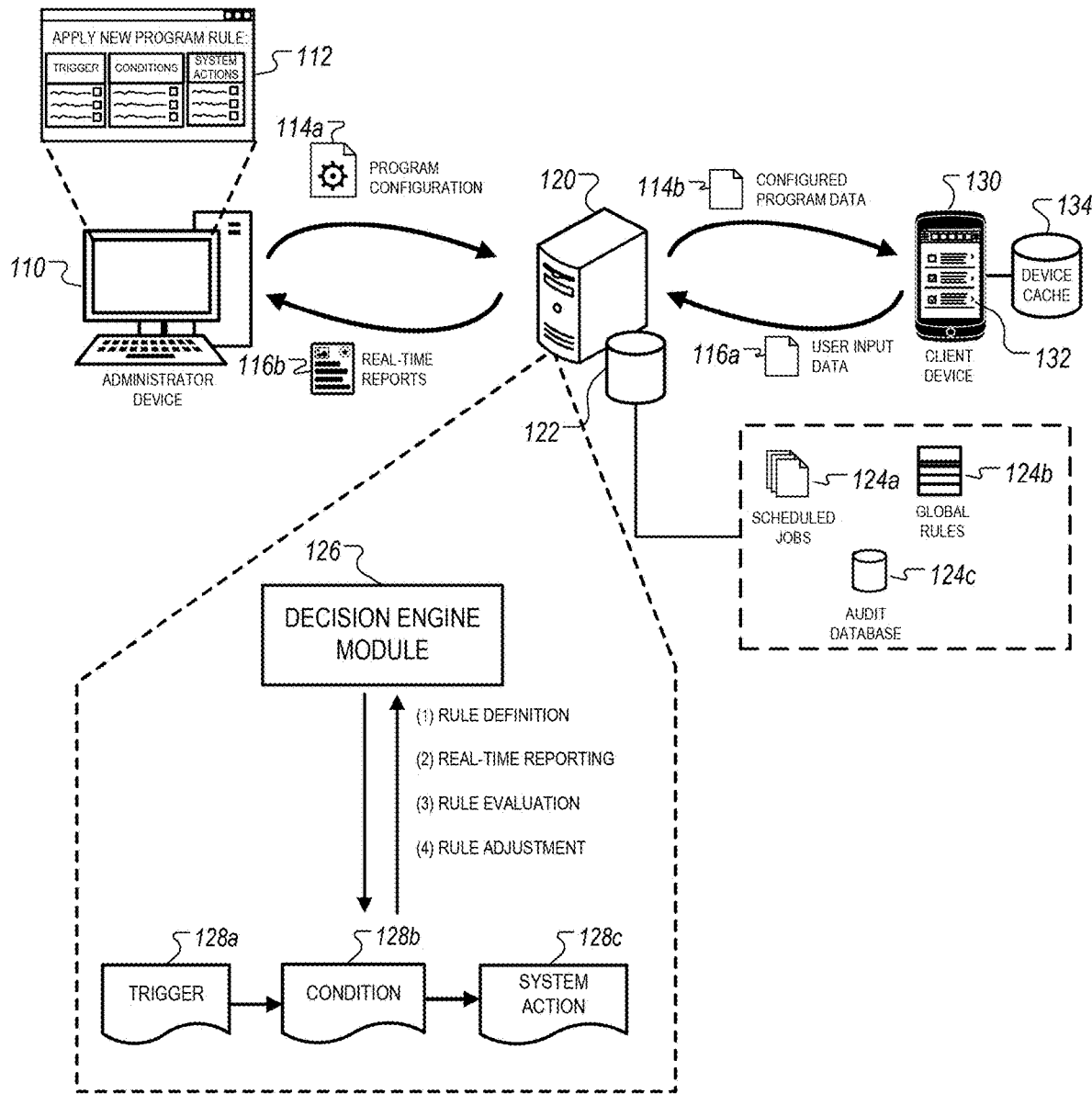
FIG. 1A is a diagram that illustrate an example of an electronic system that is capable of configuring rules that dynamically adjust application behavior.

In general, a system enables an administrator to customize a set of rules that dynamically adjust the configuration and output of an application provided to users. The rules may include sets of triggers, evaluation conditions, and system actions. When certain triggers or evaluation conditions are satisfied, the system actions specified by the rules are executed. The rules can be configured by the administrator prior to the start of a program on the application, and then subsequently adjusted by the administrator during the user's participation in the program. The system acts as a platform that allows third parties, such as administrators of different programs, to easily fine-tune their rules to adjust the user experiences provided through their programs.

Adjustments to rules by the administrators can be implemented in real-time to change the way an application interacts with users. In this regard, configuration of the rules allows for the creation of various programs on a single application that are applicable for a large user population. Although general sets of rules may apply to many different users, the outcome of the rules can use the context of each user in determining which content and interactions to provide, resulting in a personalized experience tailored for each user even when using the same rule set. At any given time, the actions performed by combinations of the rules will be different for different users, providing each user a unique experience tailored to his or her unique circumstances.

As described herein, an "administrator" refers to an entity or individual that interacts with a configuration interface of the system to manage a program. This can include specifying a set of triggers, evaluation conditions, and system actions for individual rules, and/or a collection of individual rules that are to be associated with a particular program. As an example, the administrator may use the configuration interface to specify the definitions (e.g., triggers, evaluation conditions, system actions) of five individual rules, and then further specify that three of the five rules are associated with a first program and that the two remaining rules are associated with a second program. In some instances, a single rule may be associated with multiple programs, whereby the multiple programs have overlapping collections of associated rules. The administrator may also use the configuration interface to identify a list of users that are eligible to receive the program, data indicating applicable healthcare providers or insurance plans, access privileges associated with particular features of the programs, or custom content that is provided on the program.

A "program" refers to a set of rules or instructions that define a user experience provided through an application. A single application can make multiple different programs available to a user, and different programs may be managed and provided by different organizations. As discussed below, a program can include collections of interactive content and rules that define when and how content should be delivered through an application. Although a program can include executable software, it is not required to be defined in this manner. Rules that define a program may be processed or interpreted by multiple devices, including user devices and server systems, to create the customized user experiences that a program provides. In some implementations, at least part of a program is implemented as a service, with one or more server systems dynamically selecting and delivering at least some of the program content to a client device, customized for a specific user.

A "healthcare provider" refers to individuals, institutions, or organizations that provide healthcare services to users. In some instances, the healthcare provider can be an individual health professional such as a physician, or an entity such as a hospital that provides preventative, curative, or rehabilitative programs for users, or a health insurance provider. Healthcare providers can use a provider portal to interact with the system, both to submit information that is accessed through appropriate modules and to receive information from users of certain modules to use in enhancing treatment. As an example, healthcare providers may submit health-related information such as electronic health records, treatment program information, or promotional material. This information may be general for a group of users (e.g., for all users who have a particular insurance plan) or specific to individual users.

A "user" or "patient" refers to an individual that uses a mobile application and one or more programs provided through the application. In some instances, the user receives healthcare-related services from the healthcare provider. For instance, the user can use a mobile application that provides a customized experience using a healthcare program created by or on behalf of the user's employer, the user's insurance company, or another entity.

A "trigger" refers to a pre-specified event or situation that signals when a rule is applicable. For example, an individual rule may have a trigger that indicates when an associated condition should be evaluated, or the occurrence of which causes the system to perform a corresponding system action specified for the event or condition. Examples of triggers include exceeding a threshold value associated with a particular user data metric (e.g., a maximal heart rate for an exercise-related condition), receiving a data that is flagged for system action (e.g., receiving an email from a healthcare provide including an updated treatment regimen), among others. Other examples of triggers are discussed below.

"Evaluation conditions" generally refer to criteria for determining whether a list of actions associated with a rule should be performed. These conditions can be expressed as logical expressions that specify a set of comparisons (e.g., greater than, less than, equal to, etc.) of data values to expected values in order to evaluate whether a condition has been satisfied. For instance, the data may include log entry data provided by users as input on the application, data indicating a program status associated with users, and/or data indicating input provided by the administrator on the configuration interface. The evaluation conditions may include multiple conditions that are each associated with specific categories of data. For example, different conditions may each be associated with a data type category, a data property, or a data property mapping.

The evaluation conditions can be used to measure a user's performance within the program against a set of program criteria specified by the administrator. For instance, the evaluation conditions can be used to determine a user's adherence to one or more treatment goals associated with a program. As an example, an evaluation condition may specify a target daily calorie loss for an exercise program, and in response to determining that the measured calorie loss for the user is greater than the target daily calorie loss, the system may determine that the evaluation condition has been satisfied. As described herein with respect to triggers, the evaluation conditions may also be adjusted by the administrator after an initial configuration of the program.

An "action" (or "system actions") refer to one or more automatic actions performed by the system in response to a satisfaction of at least one trigger and/or evaluation condition specified by an individual rule. Examples of actions may include transmitting push notifications to various devices associated with the program (e.g., administrator device, client devices, provider device, etc.), escalating a status of a particular user's account associated with the program, delivering content to a particular user device, transmitting prompts to enable a user to provide information on a user interface of the application, among others.

FIG. 1A is a diagram that illustrates an example of an electronic system 100. The system 100 generally includes one or more administrator devices 110, a server 120, and one or more client devices 130 connected over a network 105. The administrator device 110 provides a configuration interface 112 that enables an administrator to configure a set of rules that dynamically adjust output of the application 132 provided to users associated with the client devices 130. The server 120 includes a decision engine module 126, which generates and adjusts configuration of a set of rules based on input provided by an administrator on the interface 112. FIG. 2 illustrates a diagram of the decision engine module 126 in greater detail.

In general, the architecture of the system 100 enables the server 120 to perform data processes that would otherwise be resource-intensive, such as dynamically processing configurations and concurrently adjusting program outputs for many different users of the mobile application 132 on different user devices, using minimal resources. For example, the server 120 periodically exchanges communications with the administrator device 110 and the user device 130 such that updated program configurations transmitted by the administrator device 110 are automatically transmitted to the user device 130 without a manual request to update the mobile application 132 on the user device 130 (e.g., by an update processed through an app store). In some implementations, the server 120 provides instructions, on an on-going basis, that adjust the interface of the application 132 in different ways for different users, according to the context and characteristics of each user.

In addition, the server 120, the administrator device 110, and the user device 130 periodically exchange data operations that enable automatic configuration and adjustment to the output of the mobile application 132 to the user device 130. For example, in each data communication with the administrator device 110 and the user device 130, the server 120 transmits a set of instructions that cause the administrator device 110 and the user device 130 to delete application data that is no longer determined to be relevant or useful to the progress of the user through the software program (e.g., outdated or satisfied rules). Instead, the server 120 transmits instructions to install additional program data that are to be specified for display on either the configuration interface 112 or the mobile application 132. In this regard, the periodic exchange between the server 120, the administrator device 110, and the user device 130 enables both the administrator device 110 and the user device 130 to utilize less storage to execute processes related to outputting the mobile application 132 based on the rules specified on the configuration interface 112.

Referring initially to the components of the system 100, the administrator device 110 may be any type of electronic computing device that is capable of providing a user interface to accept input from an administrator. For example, the administrator device 110 may be smartphone, a tablet computing device, a wearable computing device, or any other type of electronic computing device.

The configuration interface 112 can be an interface associated with an administrator portal where an administrator provides input to configure programs associated with the application 132. For instance, as depicted in the example, the configuration interface 112 enables an administrator to specify a new rule associated with a particular program provided through the application 132. The configuration interface 112 also enables the administrator to provide real-time adjustments to rule definitions and/or collections of rules associated with a particular program in order to dynamically adjust output of the application 132 on the user device 130.

The configuration interface 112 may be presented on the administrator device 110, for example, as a webpage or through an administrator application associated with the application 132. In some implementations, the administrator application may be a mobile or desktop application from an organization that provides the application 132. In other implementations, the configuration interface 112 may be a separate interface on the application 132 that is provided only to administrators. In such implementations, the administrator may use specific user credential data to obtain access to the configuration interface 112.

The server 120 may be one or more electronic computing devices located remotely from the user device 130. The server 120 monitors and controls the data transmissions between the administrator device 110 and the user device 130. For instance, the server 120 can process data that is periodically exchanged between the administrator device 110 and the user device 130 in order to dynamically adjust output of the application 132 to the user device 130. The server 120 includes a database 122 that stores program data. The stored program data can include scheduled jobs 124a, global rules 124b, and audit logs 124c.

The scheduled jobs 124a can be a queue of actions and/or processes to be executed on the user device 130 based on satisfaction of triggers and/or evaluation conditions of individual rules since the prior data exchange between the server 120 and the user device 130. For instance, the content of the scheduled jobs 124a can be adjusted based on the operations of the decision engine module 126 such that, at each instance when the decision engine module 126 determines that the trigger or an evaluation condition for a particular rule has been satisfied, the corresponding system action to be performed is then added to the scheduled jobs 124a. In this regard, the scheduled jobs 124a specifies a set of instructions that are included within the configured program data 114b during the next data exchange between the server 120 and the user device 130.

The global rules 124b can be a set of configuration rules associated with protocols for various programs that are provided on the mobile application 132. The global rules 124b can be used to trigger the display of specific user-selectable content based on the data in the user input data 116a satisfying one or more triggers or evaluation conditions specified by the global rules 124b. An example of a global rule is that access to new content should be provided if a user action has satisfied a trigger for a particular program. Another example of global rule is that a notification on the application 132 should be provided if received user input data 116a indicates that as a daily minimum level of physical activity has not been met by the user.

The audit logs 124c may be a repository that tracks information associated related to the satisfaction of triggers and/or evaluation conditions specified by individual rules associated with a program. For instance, the audit logs 124c may include timestamps indicating when a particular trigger or evaluation condition was satisfied by activity of the user on the application 132, and other associated information such as, for example, a classification of the type of user activity satisfying the trigger or condition, a rule identifier corresponding to the applicable rule, user data within a particular time window before or after the satisfaction of the trigger or condition. The audit logs 124c essentially provide performance-related information associated with condition evaluation such that an administrator can then evaluate the effectiveness of previously configured rules given the information indicated by the audit logs 124c. In some instances, the data included within the audit logs 124c may be repackaged and transmitted for display on the configuration interface 112 as data reports, e.g., in the form of data visualizations, output of decision support algorithms, or performance summaries.

The server 120 also includes a decision engine module 126 that performs a set of operations generally including rule definition, real-time reporting, rule evaluation, and rule adjustment. Briefly, rule definition refers to a configuration of a program based on the data included within the program configuration 114a received from the administrator device 110. Real-time reporting refers to dynamic processing of the user input data 116a and generation of real-time reports 116b concurrently with the execution of a configured program on the application 132. Rule evaluation refers to automated processing and analysis of the user input data 116a in relation to rules in the program configuration 114a. Rule adjustment refers to the processing of a set of rule adjustments, received from the administrator device 110, for an already configured program based on the transmitted real-time reports 116b. More particular descriptions of operations performed the decision engine module 126 are provided with respect to FIGS. 2A-2B.

The user device 130 can be any of the various types of electronic devices that are capable of providing a user interface. Although FIG. 1A depicts the user device 110 as a smartphone, in other implementations, the device 110 can be, for example, a tablet computing device, a laptop computing device, a desktop computing device, or a wearable device (e.g., a smart watch, glasses, or a bracelet). In addition, the user interface of the application 132 provided on the user device 130 may include information provided through a visual display, but may additionally or alternatively provide information through, for example, audio output, haptic output, or other output, which may be dynamically configured based on information associated with the user.

Referring now to the example depicted in FIG. 1A, the administrator device 110 initially transmits a program configuration 114a to the server 120. The decision engine 126 then generates a set of configured program data 114b to transmit to the user device 130 based on the triggers 128a, conditions 128b, and system actions 128c included within the program configuration 114a, and program data stored on a database 122 (e.g., scheduled jobs 124a, global rules 124b, audit logs 124c). The user device 130 then generate and provide the application 132 for display to users based on the configured program data 114b.

After the application 132 is provided for output on the user device 130, the server 120 then periodically monitors user activity data 116a describing user interaction with the application 132. The user activity data 116a is collected and transmitted to the server 120, which then evaluates the effectiveness of the program configurations 114a. The results of the evaluation are then aggregated and packaged into a set of real-time reports 116b, which are then transmitted back to the administrator device 110 for rule assessment and adjustment. As described more particularly below, this process may be iteratively performed to dynamically adjust the output of the application 132 on the user device 130 without any intervention or action by the user.

In more detail, the program configuration 114a specifies a set of rule definitions provided by the administrator through the configuration interface 112. For example, an administrator may define a rule by associating one or more triggers and/or evaluation conditions with one or more system actions. In another example, the administrator may also specify that a collection of rules that are associated with a program that is provided on the application 132. In this regard, the program configuration 144a specifies definitions for individual rules (e.g., administrator-specified associations of triggers, evaluation conditions, and system actions), and a collection of rules to be associated with a particular program.

The configured program data 114b includes instructions for the user device 130 to execute a set of operations related to the output of the application 132. For example, the configured program data 114b may include instructions to execute the scheduled jobs 124a which were previously stored on the database 122. As another example, the configured program data 114b may instruct performance of system actions specified by rules which have triggers and/or evaluation conditions that have been determined to be satisfied by the decision engine 126. This can include providing customized content specified by rules that are determined to be satisfied, arranging content in a particular arrangement specified by rules that are determined to be satisfied, and so on. Of course, some system actions may be performed by the server 120 while other system actions may be performed by the client device 130.

In some instances, when program rules are processed by the client device 130, the configured program data 114b includes data indicating adjustments to rules that are provided by the administrator on the configuration interface 112. In such instances, the configured program data 114b is used to dynamically adjust the output of the application 132 on the user device 130.

The user input data 116a may include data indicating user interactions with the application 132, and/or sensor data generated or received by the user device 130. For instance, the user input data 116a may include survey response data submitted by the user on the mobile application 132, user selections in response to requests for information, among other types of user input data. The user input data 116a can also include sensor data received by the user device 130 and provided by the user while participating in activities associated a particular program. For example, sensor data can include heart rate measurements of a user during an exercise-related activity, a picture of the user and/or a region of the body of the user undergoing treatment, or physiological measurements made by external devices that exchange data communications with the user device 130 during a specified period of a particular program.

As described herein, a program can be structured based on different configurations of applicable rules by the administrator. In some instances, a program can be varied based on combinations of triggers, conditions and system actions for each individual rule. In other instances, a program can be varied based on the composition of a collection of rules where individual rules interact with one another to configure the program. In each instance, an administrator can configure rules that alter the experience provided to users of a program.

The program can also be adjusted after configuration by the administrator. For instance, an administrator may adjust the specifications of individual rules or adjust the composition of individual rules within a collection of rules for a particular program in order to adjust the program after initial configuration. The program adjustment may be processed by the system in substantially same manner as an initial configuration so that adjustments can be dynamically provided to users without requiring any additional actions from the user. The adjustments to rules can, in turn, change various aspects of the program. For example, adjustments can specify (i) different collections of content items to provide as part of a program, (ii) different interactivity settings that coordinate the presentation of content items on an interface of the application, (iii) different arrangements of previously provided content items, among others.

To minimize the computational resources requirements necessary to provide personalized content, the system utilizes a set of global rules that enable a server to perform a smaller number of processing steps to provide personalized experience for all users while providing varied user interfaces. For instance, the rules can be used to adjust types of content provided for each individual user using a set of common adjustment and distribution schemes to allow for use shared resources in providing personalized content for groups of users that are predetermined to be similar to one another. For example, the server may be capable of clustering content data based on prior activity within a program, similar demographic information, by similar programs, among other types of classifications.

The set of rules associated with a program can vary in scope and in hierarchy to enable the system to select particular rules from the set of global rules to adjustably execute aspects associated with the data processing of the personalized content. In this regard, the system may select applicable rules to guide data processing in order to maximize resource allocation efficiency. For example, rule selection may be based on the different types of content to be provided, the size of the content to be provided, and/or the number of users that are associated with particular types of content to be provided.

The rules associated with a program can also have an assigned scope of applicability. Different rules may be designated to apply for only specific segments, tracks, or levels within a program. Rules may be defined for combinations of these program elements. For example, a rule may be defined to apply only during a particular segment or time period of a program and also only for a particular track and level within the track. The data for each rule may include a value or code that indicates its applicability, allowing the appropriate rules for any given portion of a program to be efficiently identified. In some implementations, the rules are arranged in a hierarchy, with some rules being applicable to a program in its entirety, some rules being applicable only for specific time periods, and others being applicable in more specific situations. Also, the computer systems that allow administrative users to build programs can provide user interfaces that allow the administrative users to alter a program by adjusting the applicability of the rules, to efficiently adjust the user experiences provided by the program.

Multiple triggers may be specified for an individual rule. In some instances, a rule may specify triggers that are each associated with different system events, but are all associated with the same system action to be performed upon the single occurrence of one of the system events specified by the triggers. In other instances, system actions may be associated with combinations of triggers such that the system action is performed after occurrences of a specified subset of triggers. In such instances, multiple system actions can be associated with different subsets and/or combinations of trigger events to further specify performance of specific actions in relation to the occurrence of particular combinations of events.

Programs can be created and administered for a wide variety of topics and purposes. Some examples below describe ways that a program may be used to encourage and assist a user to improve health, e.g., by establishing better habits or helping to deal with a medical condition. The techniques of generating, delivering, and using programs is not limited to healthcare, however, and the same techniques can be used to provide customized user experiences to many other types of applications.

Figure 1B:
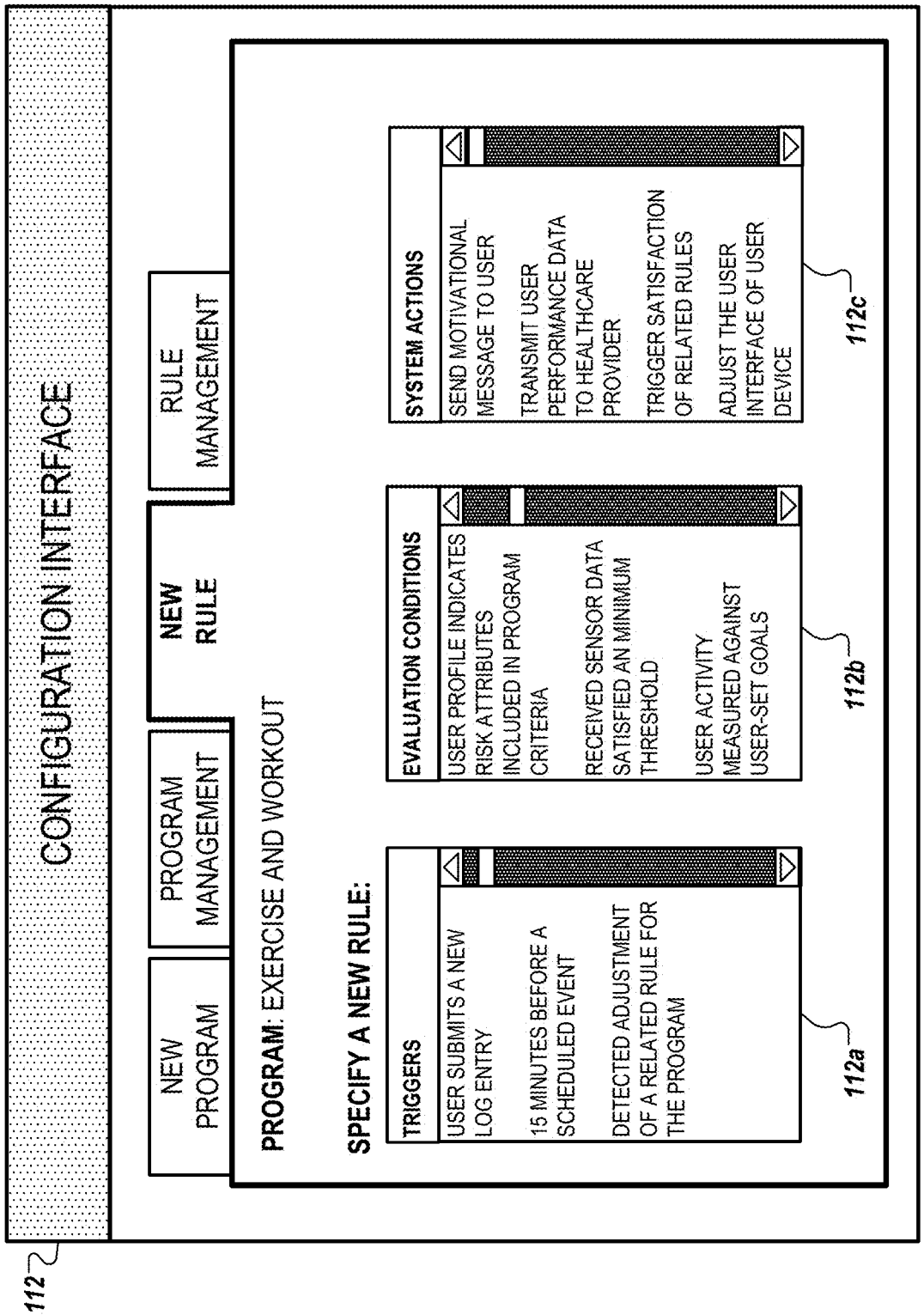
FIG. 1B is a diagram that illustrates an example of a user interface that may be used to configure rules for a program.

FIG. 1B is a diagram that illustrates an example of the configuration interface 112 that can be used by the administrator 102 to configure rules to dynamically adjust output of the application 132. For instance, the configuration interface 112 enables an administrator to configure a new rule by associating one or more triggers, one or more evaluations, and a system action from a list of available options for each selection. While the descriptions below are provided for exemplary purposes, more particular descriptions related to the different types of triggers, evaluations, or system actions are provided with respect to FIG. 3.

The configuration interface 112 provides a list of triggers 112a, a list of evaluation conditions 112b, and a list of system actions 122c. The list of triggers 112a identifies events that initiate the rule evaluation techniques performed by the decision engine module 126 described previously with respect to FIG. 1A. For example, a first trigger may be satisfied when a user submits a new log entry that includes user-submitted data to the application 132. In another example, a second trigger may also be satisfied based on the start of a time window associated with a program schedule such as a scheduled exercise event. In yet another example, a third trigger may also be satisfied for a rule if the administrator has recently adjusted a related rule for the same associated program.

The list of evaluation conditions 112b identify expressions that are used to evaluate whether the system should initiate the selected system action from the list of system actions 112c. For example, the first evaluation condition may be satisfied if the user's medical history includes a risk condition that is also identified as risk condition for a particular program (e.g., risk of heart attack associated with an exercise program). In another example, the second evaluation condition may be satisfied if received sensor data indicates that a particular measurement parameter satisfies a threshold specified for the program (e.g., total calories burned for an exercise event). In yet another example, the third evaluation condition may be satisfied if measured user activity over a time period on the application 132 meets a set of goals associated with the program (e.g., user-set goal to lose fifteen pounds within a three-month time frame).

The list of system actions 112c identify actions that may be performed in response to a satisfaction of the triggers 112a or the evaluation conditions 112b. For example, the first system action specifies the transmission for a motivational message to improve user performance within the program. In another example, the second system action specifies the transmission of user performance data to a healthcare provider for the program in order to improve subsequent instances of the program. In yet another example, the third system action specifies the automatic satisfaction of related rules for the same program.

In some implementations, the administrator 102 can use the configuration interface 112 to test the execution of configured rules on a test environment of the application 132 prior to transmitting the program configuration 114a to the server 120. For instance, the administrator 102 may specify different rules for a particular program and then compare predicted performance differences between the execution of each rule on the application 132. Different rules can be evaluated using split testing techniques to determine the preferable configuration of the rules given a set of computed performance metrics. As an example, alternate configurations of a rule that is focused on improving user interaction can be compared based on predicting a likelihood that each rule configuration will result in the user providing a positive user input on the application 132. In this example, historical user input information obtained from the real-time reports 116b can be used to estimate the impact of the alternative rule configurations on subsequent user activity on the application 132.

In some instances, the administrator 102 can use the configuration interface 112 to configure rules that are not associated with a particular trigger. In such instances, rules can be configured to be manually triggered either by an administrator 102 or triggered in conjunction with the triggering and/or execution of another associated rule. In other instances, the administrator 102 can configure rules that specify null conditions for the evaluation condition. In such instances, rules can be configured to always enable the automatic execution of a specified system action in response to a satisfaction of the trigger. In this regard, the selection of triggers and/or conditions by the administrator 102 can be used to adjust the sensitivity by which rule execution is initiated and/or completed.

Although FIG. 1B illustrates rule configuration on the configuration interface 112 as a selection of user-selectable options from the list of triggers 112a, the list of evaluation conditions 112b, and the list of system actions 112c, the configuration interface 112 may provide other means of configuring rules. For example, the configuration interface 112 may additionally or alternatively provide a text field to allow the administrator 102 to input a logical expression such as a structured query language (SQL) for setting evaluation conditions for a configured rule. In some instances, such complicated configuration interfaces can be provided as a customizable option that enables the administrator 102 with greater flexibility in configuring rules.

Figure 2A:
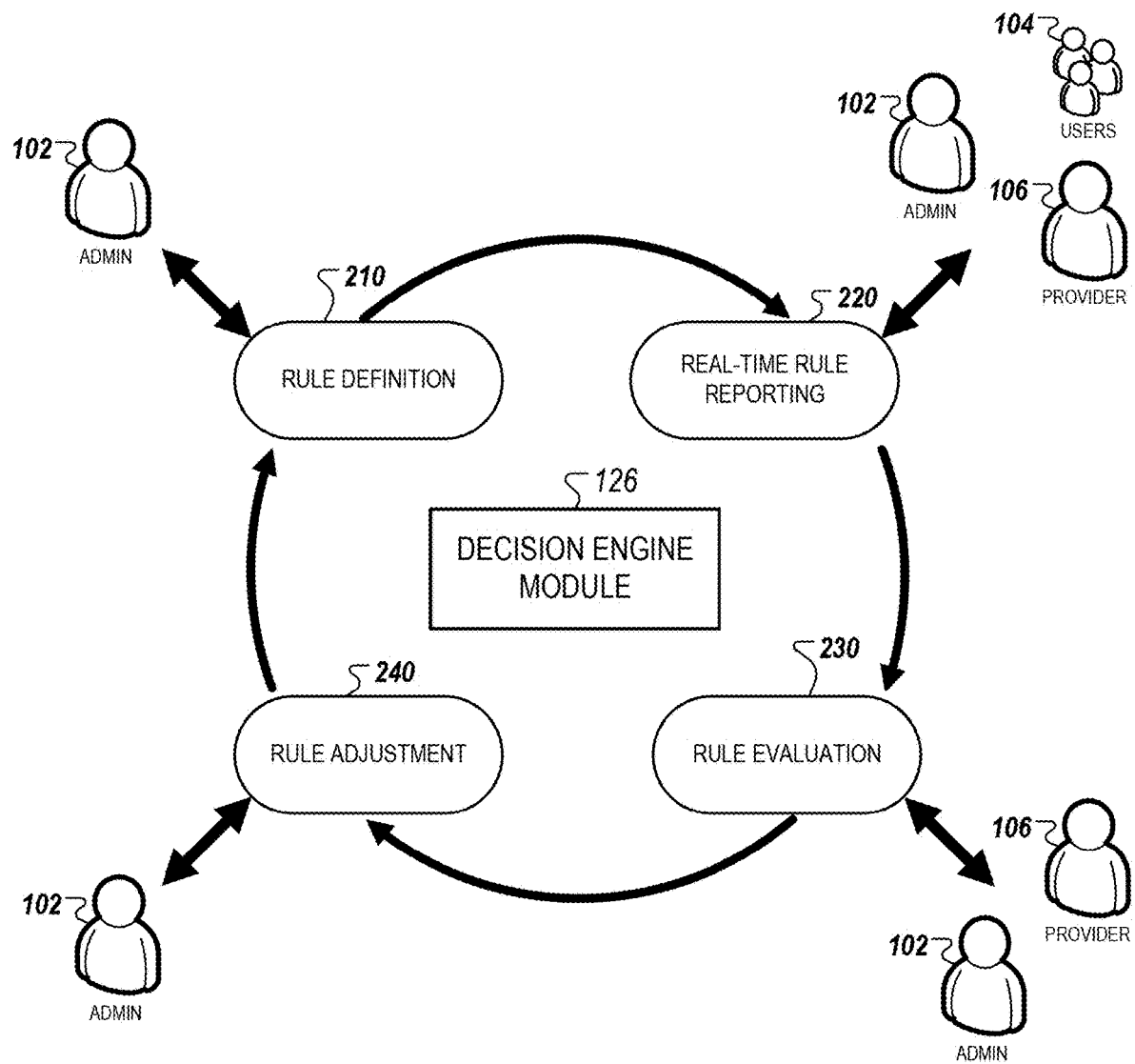
FIG. 2A is a diagram that illustrates examples of rule configuration and adjustment operations performed by a decision engine module.

FIG. 2A is a diagram that illustrates examples of rule configuration and adjustment operations performed by the decision engine module 126 of the server 120. The operations generally include rule definition (210), real-time rule reporting (220), rule evaluation (230), and rule adjustment (240).

In general, the decision engine module 126 may iteratively perform the operations 210-240 on a reoccurring basis so that each iteration results in training the decision engine module 126 to become more responsive to program requirements associated with each of the administrator 102, the users 104, and the provider 106. For example, during each operation, the decision engine module 126 exchanges data transmissions with devices associated with the applicable entities in order to obtain and transmit data and/or feedback related to the applicability of rules that are processed by the decision engine module 126 in relation to the users' real-time participation in the application 132 (e.g., progression through a fixed time period program).

Referring initially to 210, the rule definition operation relates to the decision engine module 126 receiving data from the administrator device 110 that specifies one or more rules for configuring the application 132. For instance, the received data may include rule specifications, provided by the administrator 102, that associate a particular trigger or condition and one or more system actions to be performed in response to a satisfaction of the particular trigger or condition. As an example, the administrator 102 may use the configuration interface 112 to specify a rule that associates a selection of one or more triggers, one or more evaluation conditions, and system actions.

Referring now to 220, the decision engine module 126 may generate real-time reports 116b based on data received from each of the administrator 102, the users 104, and the provider 106. For instance, the real-time reports 116b may be generated based on comparing data included in the user input data 116a to program criteria specified within the program configuration 114a, and evaluating the relevance and/or effectiveness of the rules specified by the administrator 104 on the configuration interface 112.

Referring now to 230, the decision engine module 126 may provide the real-time reports 116b for output to the administrator device 110 and/or systems associated with provider 106. The decision engine module 126 may also generate audit logs 124c based on the user input data 116a received from the user device 130. As described previously with respect to FIG. 1A, the audit logs 124c may provide data that represents analyses related to the satisfaction of triggers and/or evaluation conditions of rules associated with programs. The audit logs 124c provided for output include information that assists the administrator 104 and/or healthcare provider 106 adjust program criteria based on the user's performance within the program indicated by the user input data 116a.

Referring finally to 240, the decision engine module 126 may receive adjustment specifications provided on the configuration interface 112 in response to data output to the administrator device 110 in step 230. For example, as described previously with respect to FIG. 1A, the adjustment specifications can include adjustments to specifications to an individual rule (e.g., changes to triggers, evaluation conditions, or system actions), or adjustments to a collections rules associated with a particular program. In this regard, the adjustment specifications provided can then be used to redefine a particular rule and re-initiate the process at the step 210.

Figure 2B:
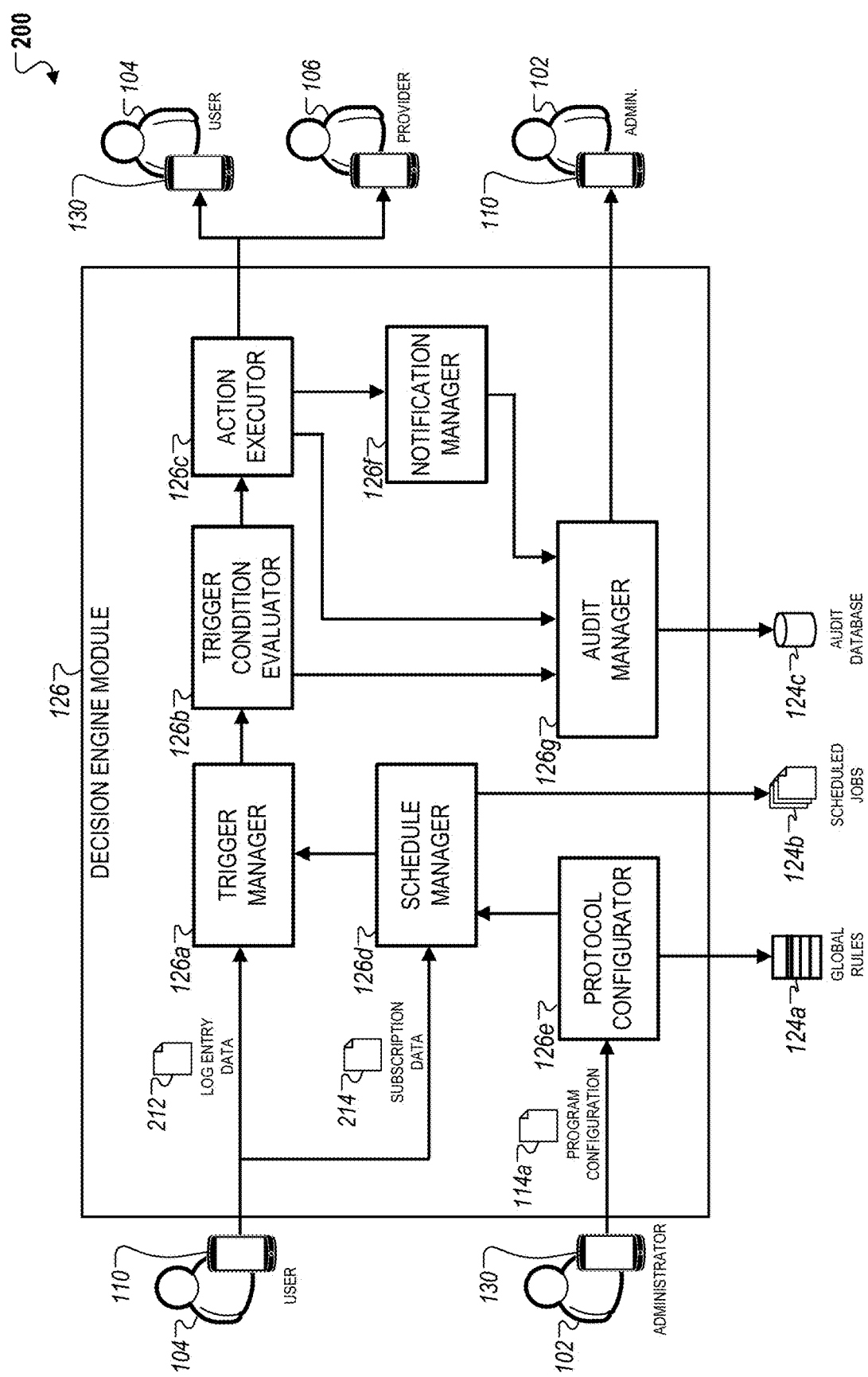
FIG. 2B is a diagram that illustrates an example of a decision engine module.

FIG. 2B is a diagram that illustrates examples of subcomponents of the decision engine module 126. The components of the decision engine module 126 generally analyze data received from the administrator device 110 and the client devices 130 using a set of predetermined processes, and then provides the output of the processes to the administrator device 110, the client devices 130, and the provider device 140. Descriptions of each of the components of the decision engine module 126, and the processes executed by the components are described below.

The components of the decision engine module 126 include a trigger manager 126a, a trigger condition evaluator 126b, an action evaluator 126c, a schedule manager 126d, a rule configurator 126e, a notification manager 126f, and an audit manager 126g. Each of these components perform a set of individual actions, and execute a set of coordinated processes in order to perform the functions of the decision engine module 126.

Referring initially to the data received from the user devices 130, the decision engine module 126 processes log entry data 212 and subscription data 214 using two different processes.

The first process relates to analyzing rules associated with a program based on the specifications previously provided by the administrator 104 on the configuration interface 112 as depicted in FIG. 1B. For instance, log entry data 212 included within user input data 116a, provided by a particular user 104 on the application 132, is initially analyzed by the trigger manager 126a. The trigger manager 126a initially determines whether triggers 128a of rules associated with a particular program have been satisfied. The received log entry data 212 is then transmitted to the condition evaluator 126b to determine whether any of the evaluation conditions 128b of the rules have been satisfied.

If either at least one trigger 128a or evaluation condition 128b is determined to be satisfied, then the trigger manager 126a and the condition evaluator 126b may collect data that is respectively associated with the satisfied condition or the satisfied evaluation condition. As described previously with respect to FIG. 1A, the collected data may include user activity data within a particular time period prior to or after a timestamp associated with satisfaction, associated data or information related to use interactions on the application 132, or other types of information that may be used to evaluate the effectiveness of the associated rules. This collected data may be handled by the audit manager 126g and stored within the audit logs 124c as described previously with respect to FIG. 1A.

In addition to storing satisfaction data collected by the trigger manager 126a and the condition evaluator 126b, the first process may also include transmitting a signal that identifies the rules with satisfied triggers and/or evaluation conditions to the action executor 126c. The action executor 126c determines system actions associated with the identified rules, and then transmits data including the determined system actions to either the user 104 or the provider 106. In some instances, this data includes a set of instructions to automatically perform the determined system actions on the user device 130 associated with the user 104. In other instances, corresponding data is transmitted to systems associated with the provider 106. As an example, if a system action specifies charging a copayment to a user for receiving a particular treatment procedure, the data transmitted by the action executor 126 can include an instruction to user device 130 (or the application 132) to charge a payment method associated with the user 104, and a corresponding instruction to provider system to record the copayment transaction for the particular procedure in a user account corresponding to the user 104 within the provider system.

The action executor 126c may also generate notifications associated with the system actions to be executed on the user device 130, and then transmit the generated notifications to the notification manager 126f, which then forwards the generated notifications to the audit manager 128g, and ultimately provided for display on the administrator device 110. For example, as described previously with respect to FIG. 1A, the notifications can include the real-time reports 116b that provide an analysis on data associated with system actions to be performed to the administrator device 110. In other instances, the notification manager 128g may directly provide the generated notifications for output on the administrator device 110 without initially transmitting the notifications through the audit manager 128g. The transmitted notification can be used by the administrator 104 to either adjust specifications for an individual rule associated with a particular program, or adjust the composition of a collection of rules associated with a particular program.

The second process performed by the decision engine module 126 for data received from the client device 110 includes processing subscription data 214 and transmitting the processed data to the schedule manager 126d. The subscription data 214 may include information relation to selections of available programs that the user 104 wishes to enroll into. For example, the subscription data 214 may include enrollment information that includes the user's medical history, log entries related to a user's goals within the selected program, among other types of information.

The schedule manager 216 then processes the information included within the subscription data 214 in order to identify scheduled jobs that the trigger manager 26a should perform in response to an initial enrollment by the user 104. For example, the schedule manager 216 may identify jobs related to initial content generation for the content to be displayed within the selected program, or updates to be set to the provider 106 or the administrator 104 indicating that the user has opted to enroll into a particular program. The identified jobs may then be stored in the scheduled jobs 124b for subsequent execution.

Referring now to the data received from the administrator device 110, the decision engine module 126 processes the program configuration 114a, described previously with respect to FIG. 1A, using the rule configurator 126e. The rule configurator 126e identifies new rule definitions within the program configuration 114a, and adds the new rule definitions to the repository of global rules 124a. For example, each time the administrator 102 defines a new rule on the configuration interface 112, the new rule definitions are then included within the program configuration 114a transmitted from the administrator device 110 to the server 120 and then stored in the global rules 124a by the rule configurator 126e. In this regard, the repository of global rules 124a expands over time to include new rule configurations associated with a particular program.

The program configurator 126e also processes changes to existing rule definitions, indicating that prior definitions may either be inapplicable to the output of the application 132. In some instances, the rule configurator 126e processes rule adjustments by generating additional instances of the pre-existing rules within the repository of global rules 124a in order to keep a track record of rule adjustments. Alternatively, in other instances, the rule configurator 126e instead replaces preexisting rule definitions with newer rule definitions in order to conserve storage capacity.

Figure 3:
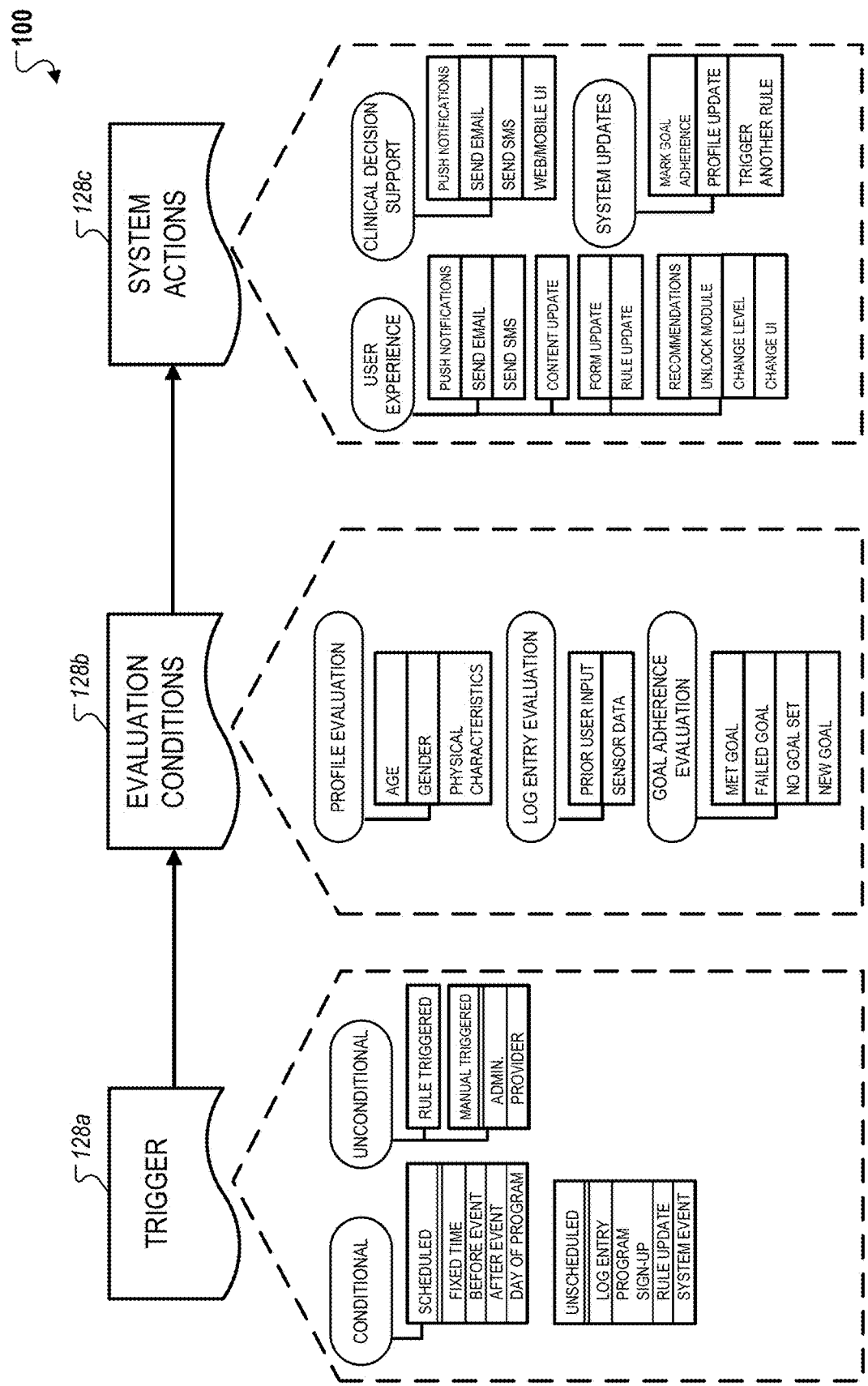
FIG. 3 is a diagram that illustrates an example of an architecture for rule configuration.

FIG. 3 is a diagram that illustrates an example of an architecture for rule configuration that relates triggers 128a, evaluation conditions 128b, and system actions 128c. As described herein, rules definitions can be specified by the administrator 102 on the configuration interface 112 depicted in FIG. 1B. Each rule definition associates selected triggers 112a, selected evaluation conditions 112b, and selected system actions 112c on the configuration interface 112. The rules are then periodically evaluated by the decision engine module 126 to identify a satisfaction of at least one the selected triggers 112a and/or the selected evaluation conditions 112b, and in response to an identified satisfaction, the system 100 may perform the selected system actions 112c.

As depicted in FIG. 3, the architecture for rule configuration can include different categories and sub-categories of triggers 128a, evaluation conditions 128b, and system actions 128c in order to vary the scope and applicability of different rules to dynamically adjust the output of the application 132. For example, the triggers 128a may generally include conditional triggers that specify events the occurrence of which are related to satisfaction of the evaluation conditions 128b, and unconditional triggers that specify events the occurrence of which are unrelated to the evaluation conditions 128b.

Conditional triggers may be sub-categorized into scheduled triggers or unscheduled triggers. For instance, scheduled triggers refer to triggers that specify events that are related to an anticipated time period (e.g., fixed time period for response), or related to the occurrence of a particular event that takes place on reoccurring basis (e.g., before event, after event). As an example, an event may that satisfies a scheduled trigger may include the daily submission of a log entry by a user 104 (e.g., submission of self-reported patient data collected on the application 132). Unscheduled triggers refer to triggers that specify events that may take-place on an ad hoc basis (e.g., initial program sign-up, or a general rule update).

Unconditional rules may be sub-categorized into rule-based triggers or manual triggers. Rule-based triggers may specify events that indicate a satisfaction of an associated or related rule (e.g., satisfaction of another rule within a collection of rules that are each associated with a particular program). Manual triggers refer to triggers that specify events related to the actions performed by administrators or providers associated with the system 100. As an example, an unconditional trigger may be satisfied based on the submission of a rule adjustment by the administrator 104 on the configuration interface 112. In another example, an unconditional trigger may be satisfied based on the submission of updated clinical treatment criteria for a particular program by the provider 106.

The evaluation conditions 128b may generally include a set of conditional expressions that are evaluated as either "true" or "false" in order to determine a satisfaction of a specified evaluation condition. The evaluation conditions 128b may generally include profile evaluation conditions, log entry evaluation conditions, and goal adherence evaluation conditions. The profile evaluation conditions generally refer to a set of expressions that analyze attributes or characteristics specified within a user profile (e.g., age, gender, physical characteristics). As an example, a profile evaluation condition may specify an age range for an at-risk population for a potential health condition that is satisfied when a user account indicates that he/she falls within the age range.

Log entry evaluation conditions refer to a set of expressions that analyze user input or data associated with user activity provided by the user on the application 132 (e.g., prior user input, sensor data). As an example, a log entry evaluation condition may specify a minimum calorie burn goal for a particular exercise program that is satisfied when received heart rate data is used to indicate that the user has completed the specified goal.

Goal adherence evaluation conditions refer to a set of expressions that analyze a user's performance throughout a program in relation to a set of performance goals specified for the user (e.g., met goal, failed goal, no goal set, new goal, etc.). As an example, a goal adherence evaluation condition may specify a target level of physical activity over a period of time (e.g., amount of steps over a month) that is satisfied when a wearable device that exchanges data with the application 132 indicates that the user's calculated steps exceeds the target level.

The system actions 128c generally refer to a set of actions to be performed by the system 100 in response to a satisfaction of at least one trigger 128a and/or evaluation condition 128b. In some instances, satisfaction of triggers 128a and evaluation conditions 128b may both be a prerequisite to perform a particular system action 128c (e.g., dual satisfaction of the trigger and evaluation condition). In other instances, the triggers 128a and the evaluation conditions 128b may instead be unrelated such that a satisfaction of either results in the performance of the specified system action 128c. System actions 128c can generally be related to patient experience, clinical decision support, and system updates.

System actions related to patient experience refer to system actions that are directed to improving the user's experience and/or performance in the program provided on the application 132. For example, such actions can include providing push notifications to improve the interactivity of the program, sending emails or SMS messages that include updates and/or other motivational information to the user. In other examples, such actions include dynamically updating the content provided on the application 132 in order to improve the user's performance associated with a particular program (e.g., adjusting content based on the user's content consumption preference).

System actions related to clinical decision support refer to system actions that are directed to informing the providers 106 of the user's performance within a program in order to further improve clinical criteria associated with the program (e.g., patient adherence to treatment conditions, improvements in post-operative recovery, etc.). For examples, such actions can include providing notifications of the user's performance and/or other associated information to providers that create the program.

System actions related to system updates refer to system actions that are directed to updating internal processes performed by the system 100 in order to more efficiently and dynamically adjust the output of the application 132. For example, such actions can include marking a goal adherence program complete so that the decision engine module 126 may subsequently process rules associated with other programs. Other examples can include updating data associated with the user in order to ensure that user account information accurately reflects the present condition of the user, or determining that the trigger of an associated rule has been satisfied in order to enhance evaluation of related conditions.

Figure 4:
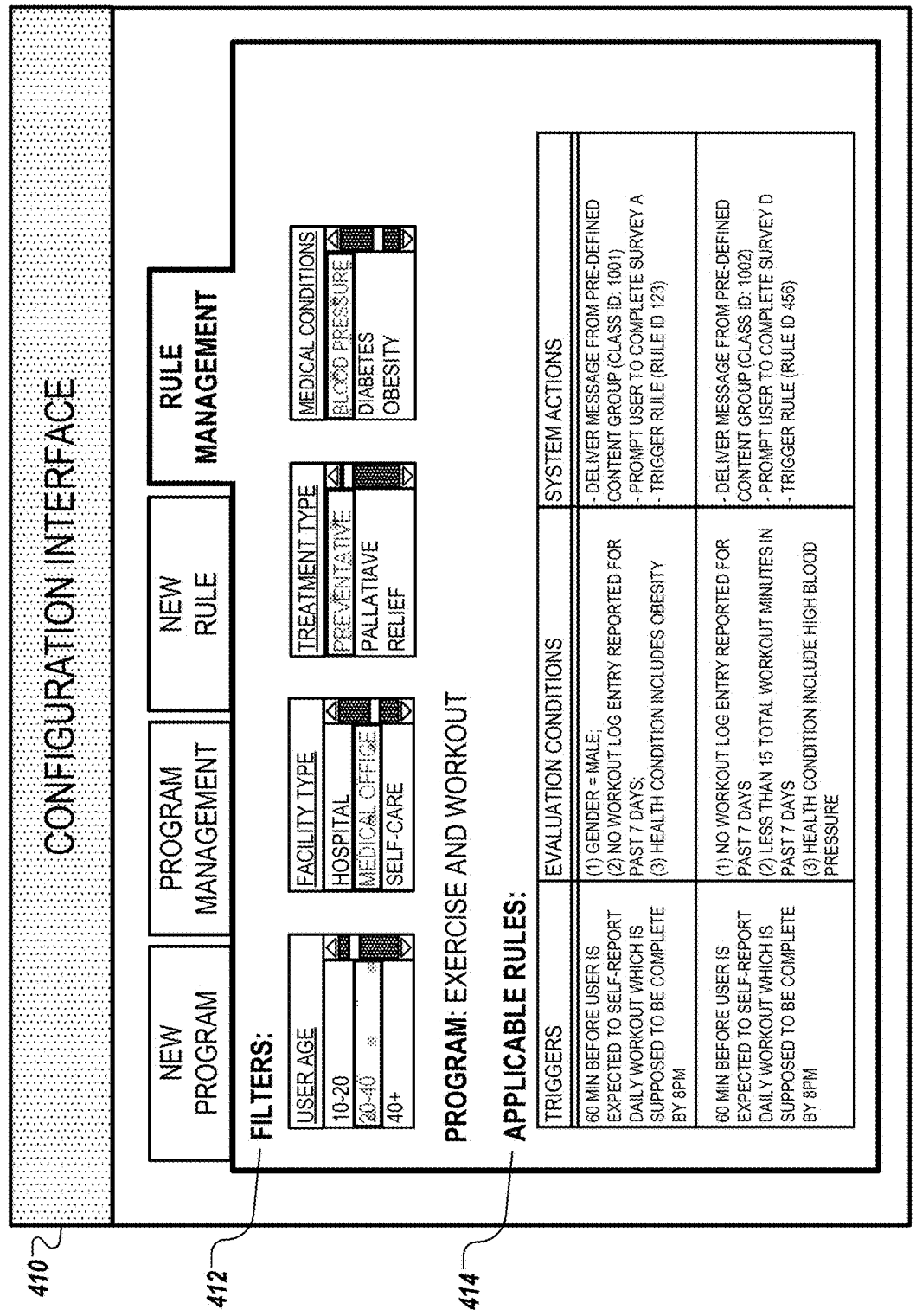
FIG. 4 is a diagram that illustrate an example of a user interface that may be used to identify applicable rules for a set of program criteria.

FIG. 4 is a diagram that illustrates an example of a configuration interface 410 that may be used by the administrator 102 to identify a list of predetermined rules 414 that are determined to be responsive to a set of filters 412 for specified program criteria. In some implementations, the interface 410 may be a different page within the interface 112 depicted in FIG. 2 that provides the administrator 102 with a different set of features to configure or reconfigure the output of the application 132 on the client devices 130.

The interface 410 enables the administrator 102 to use a set of filters 412 to provide program criteria. For example, the filters may include a target user age range, a facility type, a treatment type, medical conditions associated with a program, among other types of filters. Selections for each of the filters enable the system to filter the repository of global rules 124b and identify rules that may be applicable to the administrator 102. In this regard, the list of predetermined rules 414 enables the administrator 102 to easily access related rules rule adjustment for an existing program, or rule selection for creating a new program.

In the examples depicted in FIG. 4, an administrator selects "20-40 years" for user age, "MEDICAL OFFICE" for facility type, "PREVENTATIVE" for treatment type, and "BLOOD PRESSURE" for medical conditions. In response to these selections, the configuration interface 410 automatically identifies a program category of "EXERCISE AND WORKOUT" based on the selections related to preventative care and blood pressure. The configuration interface 410 also provides a set of applicable rules that are determined to be associated with the selections.

The two applicable rules provided both indicate a trigger that specifies a self-reporting event by the user and two conditions associated with the event (e.g., time period before self-reporting event, and completion time for the event). The two applicable rules also provide different respective evaluation conditions to cover different conditions associated with the trigger event. For example, the first rule is directed towards inactive male patients that are predisposed to obesity, whereas the second rule is directed towards patients of both genders who are obtaining insufficient exercise and are predisposed to having high blood pressure. As described previously with respect to FIG. 1A, the difference in evaluation conditions of each of the rules allows for varying scopes of applicability to users (e.g., the first rule is only applicable to men, and the second rule is applicable to both genders).

The two applicable rules also provide different system actions based on the different evaluation conditions. For example, each of the rules specify the delivery of a message from different content groups, prompt users to complete different surveys, and triggering of different rules. In this regard, the different evaluation conditions can be used to direct different adjustments to the application 132 in response to satisfaction of the trigger and/or evaluation condition of the applicable rule.

Figure 5:
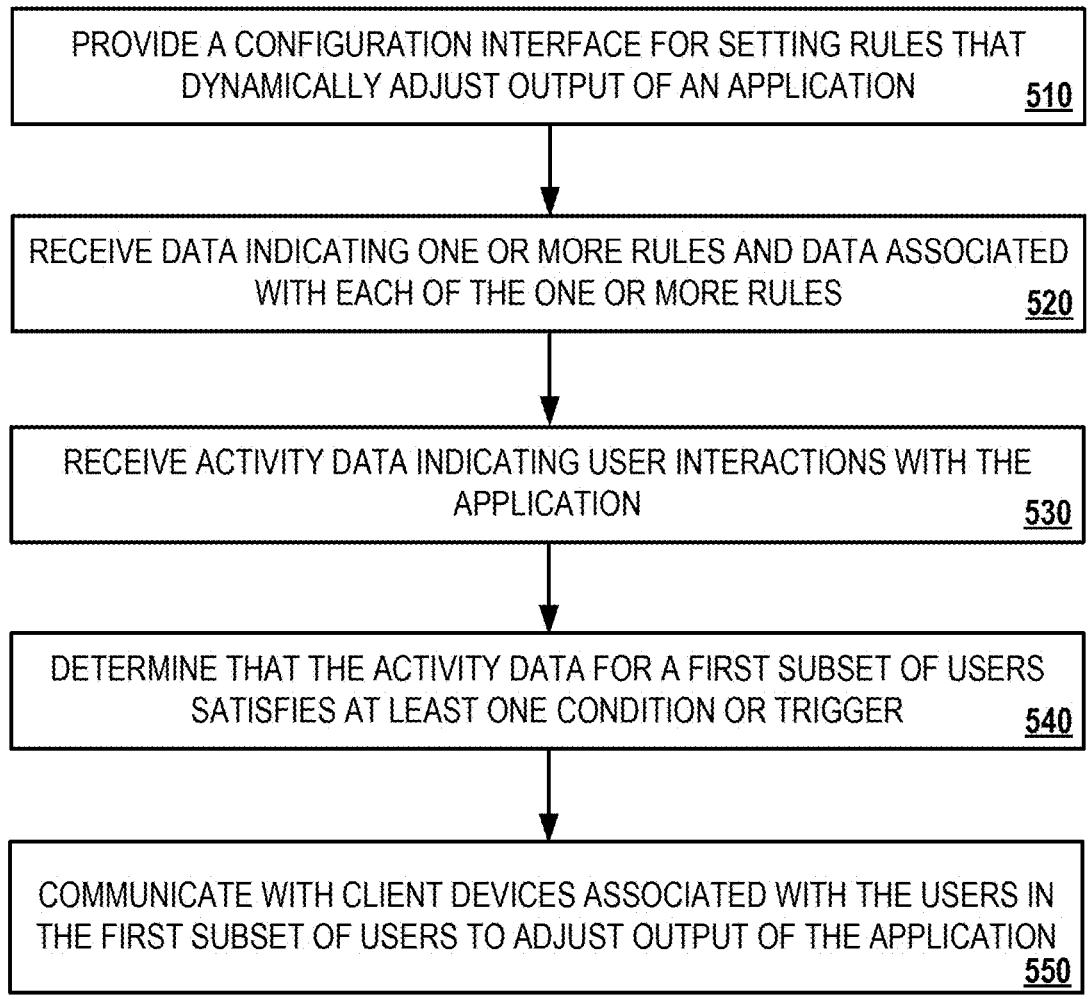
FIG. 5 is a diagram of an example of a process for dynamically adjusting output of an application provided to users.

FIG. 5 is a diagram of an example of a process 500 for dynamically adjusting a configuration of a program provided to users. Briefly, the process 500 may include providing a configuration interface for setting rules that dynamically adjust output of an application (510), receiving data indicating one or more rules and data associated with each of the one or more rules (520), receiving activity data indicating user interactions with the application (530), determining that the activity data for a first subset of users satisfies at least one condition or trigger (540), and communicating with client devices associated with the users in the first subset of users to adjust output of the application (550).

In more detail, the process 500 may include providing a configuration interface for setting rules that dynamically adjust output of an application (510). For instance, the administrator device 110 may provide the configuration interface 112 for setting rules that dynamically adjust output of the application 132 provides to a plurality of users. The configuration interface 112 permits the rules to be specified using combinations of input triggers 128a, conditions 128b, and actions 128c.

As described above, the application 132 can be used to provide users with access to a plurality programs that each provide different sets of interactive content through the application 132. For example, programs can be designed for the treatment of specific health conditions experienced by a population of users (e.g., chronic illnesses). In this regard, rules that dynamically adjust the output of the application 132 can include global rules 124b that are associated with each of the programs that are provided on the application 132, and program rules that are specifically associated only with a particular program. For example, global rules can be used to dynamically change content that is provided across all programs, whereas program rules can be used only to dynamically change content that is provided on a specific program.

In some implementations, dynamically adjusting the output of the application 132 provided to the plurality of users includes adjusting the content to be displayed on the application 132 or an arrangement of content to be displayed. For example, a change to an arrangement can be used to reflect changes to prioritizations of different types of content based on user activity, whereas changes to the content to be displayed can be used to adjust what the user is able to view and interact with on the application 132. In these examples, content can be displayed can be determined based on comparing user activity data for different users against triggers and/or conditions specified by the configured rules. User devices of users whose activity data satisfies at least one condition or trigger, can be provided the content for display whereas user devices of users whose activity data does not satisfy at least one condition or trigger are prevented from receiving the content. In this regard, the system can utilize rules to adjust how content is transmitted to different subsets of users within a population of users.

In some implementations, the configuration interface 112 is provided to different administrators that are each associated with a different organization. In such implementations, rules configured by the different administrators on the configuration interface 112 are associated with respective programs provided by the different organizations. For example, healthcare providers associated with different medical insurance companies can provide specific programs that are only accessible by users that have supported medical insurance plans. In this regard, the configuration interface 112 can be used to enable multiple organizations to use the same means to provide independent content through the same application (e.g., the application 132).

The process 500 may include receiving data including one or more rules and data associated with each of the one or more rules (520). For instance, the administrator device 110 may receive data through the configuration interface 112 that indicates one or more rules. The administrator device 110 may also receive data for each of the one or more rules that specifies at least one selected trigger 112a or condition 112b, and one or more selected system actions 112c to be performed in response to a satisfaction of the at least one selected trigger 112a or condition 112b.

In some implementations, the server 120 may additionally receive data indicating historical information indicating the satisfaction of triggers or conditions over a period of time. For example, as described above, the administrator device 110 may receive real-time reports 116b from the server 120 that include user input data 116a received on the application 132 over a particular period of time.

The administrator device 110 can then provide various user-selectable options on the configuration interface to adjust one or more existing rules. As illustrated in FIG. 1B, the administrator 102 can use historical information to adjust the triggers and/or rules associated with an existing rule of the historical user input data indicates that the existing rule has been ineffective in achieving its intended purpose. As examples, the administrator 102 can be provided with a user-selectable option to adjust a collection of rules associated with a particular program that includes a particular rule, or adjust the combination of triggers, conditions, and/or actions of the particular rule.

In addition, the obtained historical information can be used to determine whether the received user input data 116a satisfies one or more triggers or conditions over a particular period of time. In some instances, as illustrated in FIG. 4, in response to determining that the historical information satisfies one or more triggers or conditions, the administrator device 110 may provide a user-selectable list of preconfigured rules that are identified based on the received user input data 116a. Once the user has modified a preexisting rule displayed on the configuration interface 410, the modified rule can then be added to a list of preconfigured rules for a program provided through the application 132. As depicted in FIG. 4, the configuration interface 410 includes a set of filters that each provide selections of program criteria such as user age, facility type, treatment type, or medical conditions for a particular program (e.g., exercise and workout).

The process 500 may include receiving activity data indicating user interactions with the application (530). For instance, the server 120 may receive activity data indicating user interaction with application or sensor data for at least some of the plurality of users of the application 132 from multiple client devices 130.

The process 500 may include determining that the activity data for a first subset of users satisfies at least one condition or trigger (540). For instance, the server 120 may determine that the activity data for a first subset of the plurality of users satisfies the at least one selected condition 112a or trigger 112b. The server 120 may also determine that the activity data for a second subset of the plurality of the users does not satisfy the at least one selected condition 112a or the trigger 112b.

The process 500 may include communicating with client devices associated with the users in the first subset of users to adjust output of the application (550). For instance, the server 120 may communicate with the client devices 130 associated with the users in the first subset to adjust output of the application 132 according to the one or more system actions of the one or more rules, while not adjusting the output of the application 132 for the users in the second subset based on the one or more rules.

Figure 6:
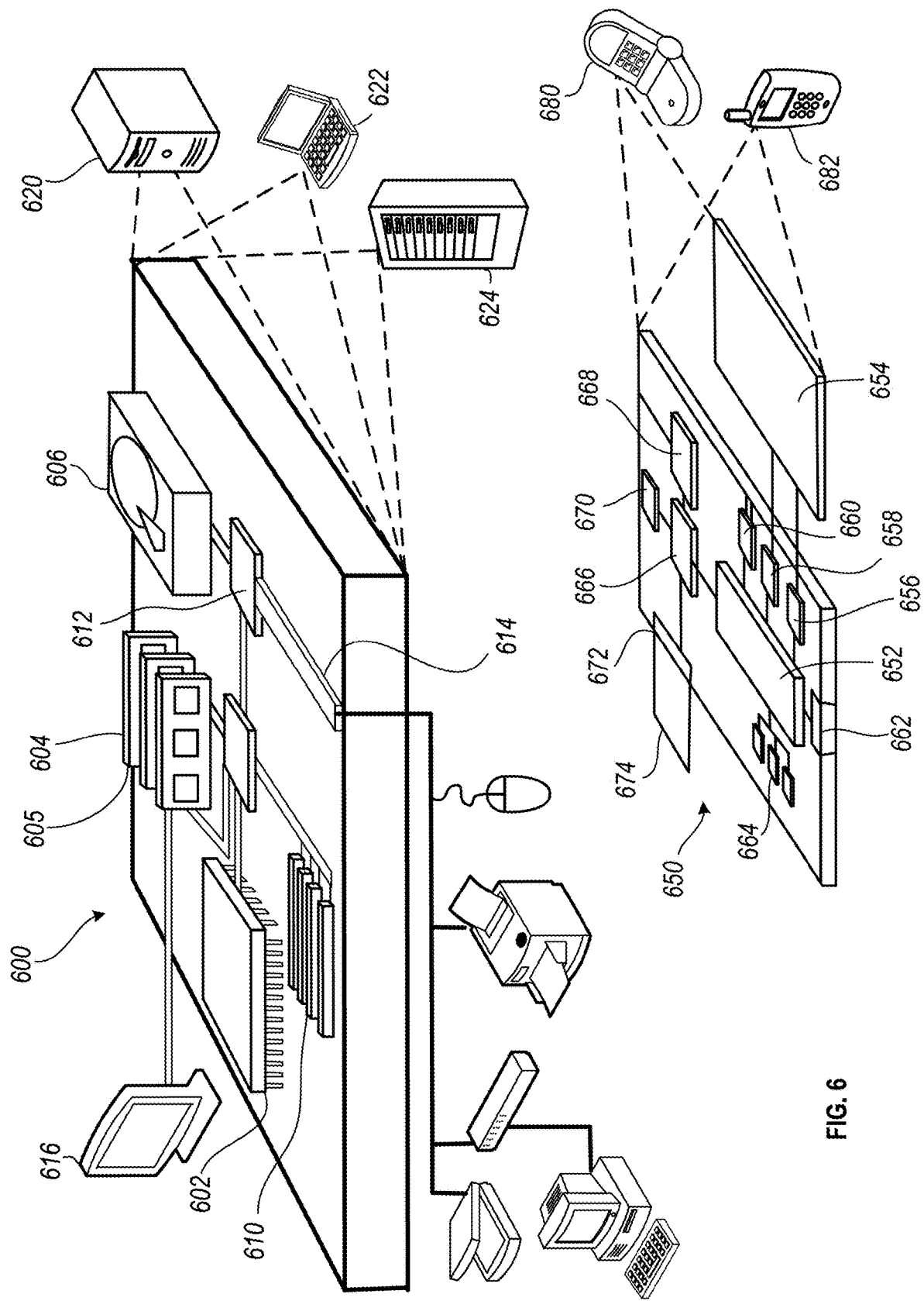
FIG. 6 is a block diagram of computing devices on which the processes described herein, or portions thereof, can be implemented.

FIG. 6 is a block diagram of computing devices 600, 650 that can be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. Additionally, computing device 600 or 650 can include Universal Serial Bus (USB) flash drives. The USB flash drives can store operating systems and other applications. The USB flash drives can include input/output components, such as a wireless transmitter or USB connector that can be inserted into a USB port of another computing device. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and can be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses can be used, as appropriate, along with multiple memories and types of memory. Also, multiple computing devices 600 can be connected, with each device providing portions of the necessary operations, e.g., as a server bank, a group of blade servers, or a multi-processor system.

The memory 604 stores information within the computing device 600. In one implementation, the memory 604 is a volatile memory unit or units. In another implementation, the memory 604 is a non-volatile memory unit or units. The memory 604 can also be another form of computer-readable medium, such as a magnetic or optical disk.

The storage device 606 is capable of providing mass storage for the computing device 600. In one implementation, the storage device 606 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth intensive operations. Such allocation of functions is exemplary only. In one implementation, the high-speed controller 608 is coupled to memory 604, display 616, e.g., through a graphics processor or accelerator, and to high-speed expansion ports 610, which can accept various expansion cards (not shown). In the implementation, low-speed controller 612 is coupled to storage device 606 and low-speed expansion port 614. The low-speed expansion port, which can include various communication ports, e.g., USB, Bluetooth, Ethernet, wireless Ethernet can be coupled to one or more input/output devices, such as a keyboard, a pointing device, microphone/speaker pair, a scanner, or a networking device such as a switch or router, e.g., through a network adapter. The computing device 600 can be implemented in a number of different forms, as shown in the figure. For example, it can be implemented as a standard server 620, or multiple times in a group of such servers. It can also be implemented as part of a rack server system 624. In addition, it can be implemented in a personal computer such as a laptop computer 622. Alternatively, components from computing device 600 can be combined with other components in a mobile device (not shown), such as device 650. Each of such devices can contain one or more of computing device 600, 650, and an entire system can be made up of multiple computing devices 600, 650 communicating with each other.

The computing device 600 can be implemented in a number of different forms, as shown in the figure. For example, it can be implemented as a standard server 620, or multiple times in a group of such servers. It can also be implemented as part of a rack server system 624. In addition, it can be implemented in a personal computer such as a laptop computer 622. Alternatively, components from computing device 600 can be combined with other components in a mobile device (not shown), such as device 650. Each of such devices can contain one or more of computing device 600, 650, and an entire system can be made up of multiple computing devices 600, 650 communicating with each other.

Computing device 650 includes a processor 652, memory 664, and an input/output device such as a display 654, a communication interface 666, and a transceiver 668, among other components. The device 650 can also be provided with a storage device, such as a microdrive or other device, to provide additional storage. Each of the components 650, 652, 664, 654, 666, and 668, are interconnected using various buses, and several of the components can be mounted on a common motherboard or in other manners as appropriate.

The processor 652 can execute instructions within the computing device 650, including instructions stored in the memory 664. The processor can be implemented as a chipset of chips that include separate and multiple analog and digital processors. Additionally, the processor can be implemented using any of a number of architectures. For example, the processor 610 can be a CISC (Complex Instruction Set Computers) processor, a RISC (Reduced Instruction Set Computer) processor, or a MISC (Minimal Instruction Set Computer) processor. The processor can provide, for example, for coordination of the other components of the device 650, such as control of user interfaces, applications run by device 650, and wireless communication by device 650.

Processor 652 can communicate with a user through control interface 658 and display interface 656 coupled to a display 654. The display 654 can be, for example, a TFT (Thin-Film-Transistor Liquid Crystal Display) display or an OLED (Organic Light Emitting Diode) display, or other appropriate display technology. The display interface 656 can comprise appropriate circuitry for driving the display 654 to present graphical and other information to a user. The control interface 658 can receive commands from a user and convert them for submission to the processor 652. In addition, an external interface 662 can be provide in communication with processor 652, so as to enable near area communication of device 650 with other devices. External interface 662 can provide, for example, for wired communication in some implementations, or for wireless communication in other implementations, and multiple interfaces can also be used.

The memory 664 stores information within the computing device 650. The memory 664 can be implemented as one or more of a computer-readable medium or media, a volatile memory unit or units, or a non-volatile memory unit or units. Expansion memory 664 can also be provided and connected to device 650 through expansion interface 662, which can include, for example, a SIMM (Single In Line Memory Module) card interface. Such expansion memory 664 can provide extra storage space for device 650, or can also store applications or other information for device 650. Specifically, expansion memory 664 can include instructions to carry out or supplement the processes described above, and can include secure information also. Thus, for example, expansion memory 664 can be provide as a security module for device 650, and can be programmed with instructions that permit secure use of device 650. In addition, secure applications can be provided via the SIMM cards, along with additional information, such as placing identifying information on the SIMM card in a non-hackable manner.

The memory can include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 664, or memory on processor 652 that can be received, for example, over transceiver 668 or external interface 662.

Device 650 can communicate wirelessly through communication interface 666, which can include digital signal processing circuitry where necessary. Communication interface 666 can provide for communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 668. In addition, short-range communication can occur, such as using a Bluetooth, Wi-Fi, or other such transceiver (not shown). In addition, GPS (Global Positioning System) receiver module 660 can provide additional navigation- and location-related wireless data to device 650, which can be used as appropriate by applications running on device 650.

Device 650 can also communicate audibly using audio codec 660, which can receive spoken information from a user and convert it to usable digital information. Audio codec 660 can likewise generate audible sound for a user, such as through a speaker, e.g., in a handset of device 650. Such sound can include sound from voice telephone calls, can include recorded sound, e.g., voice messages, music files, etc. and can also include sound generated by applications operating on device 650.

The computing device 650 can be implemented in a number of different forms, as shown in the figure. For example, it can be implemented as a cellular telephone 480. It can also be implemented as part of a smartphone 682, personal digital assistant, or other similar mobile device.

Various implementations of the systems and methods described here can be realized in digital electronic circuitry, integrated circuitry, specially designed ASICs (application specific integrated circuits), computer hardware, firmware, software, and/or combinations of such implementations. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor for displaying information to the user and a keyboard and a pointing device, e.g., a mouse or a trackball by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the systems and techniques described here, or any combination of such back end, middleware, or front end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications can be made without departing from the spirit and scope of the invention. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A method performed by one or more computers, the method comprising:

providing, by the one or more computers, a configuration interface having functionality to define rules of a program that affect how the program interacts with users enrolled in the program, the program being configured to provide interactions with users through a software application on client devices of users enrolled in the program, wherein the configuration interface enables rule adjustment for the program through a user interface that includes interactive elements to define a new rule for the program or change an existing rule for the program, wherein the interactive elements enable selection or specification of at least one of (i) a trigger for initiating processing of a rule, (ii) an action for a server system or client device to perform based on the rule, or (iii) a requirement for a condition to be satisfied in order to perform the action based on the rule;

receiving, by the one or more computers and through the configuration interface, program configuration data indicating one or more rules for the program that are specified using the configuration interface, wherein at least one rule of the one or more rules includes one or more criteria for selectively performing a particular action based on at least one of (i) a physiological measure or (ii) user behavior other than user interface interactions;

generating, by the one or more computers, program data for the program based on the one or more rules specified by the program configuration data, wherein the generated program data includes the at least one rule and is configured to cause the software application to selectively perform the particular action based on at least one of (i) the physiological measure or (ii) the user behavior; and providing, by the one or more computers, the generated program data to a particular client device over a communication network, wherein the generated program data is configured to cause the software application on the particular client device to interact with a user of the particular client device according to the one or more rules of the program, wherein the generated program data specifies the one or more rules of the program in a manner that enables the software application to determine whether the one or more criteria for performing the particular action associated with the at least one rule have been satisfied for the user of the particular client device.

2. The method of claim 1, wherein the at least one rule specifies to selectively perform the action based on at least one of (i) the physiological measure as determined using one or more sensors of a device or (ii) the user behavior as detected using one or more sensors of a device; and
   wherein the generated program data is configured to cause the software application to selectively perform the action based on at least one of (i) the physiological measure determined using one or more sensors of a device or (ii) the user behavior detected using one or more sensors of the device.

3. The method of claim 2, wherein the at least one rule specifies to perform the particular action when the physiological measure determined using the one or more sensors satisfies a threshold.

4. The method of claim 2, wherein the at least one rule specifies to perform the particular action when a measure of the user behavior detected using the one or more sensors satisfies a threshold.

5. The method of claim 1, further comprising:
   receiving, through the configuration interface, an indication of a change to a particular rule for the program; and
   providing, through the configuration interface, a prediction indicating a change in a performance metric that is predicted to occur as a result of the change in the particular rule.

6. The method of claim 5, wherein the prediction indicates a change in a likelihood that users will provide user input through the application after the change to the particular rule.

7. The method of claim 1, wherein providing the generated program data comprises providing program data that is configured to cause the particular client device to:
   determine the physiological measure or a user behavior measure for the user behavior;
   detect when the physiological measure or the user behavior measure satisfies a threshold; and
   perform the particular action when the physiological measure or the user behavior measure is detected to satisfy the threshold.

8. The method of claim 1, comprising:
   storing data defining each of multiple different programs that are configured to interact with different users through the software application, each of the multiple different programs having different sets of rules specified using the configuration interface; and
   providing, by the one or more computers, program data for the multiple different programs to different client devices of the different users enrolled in the respective programs.

9. The method of claim 1, wherein providing the configuration interface comprises providing, over the communication network, data for the user interface for display by a computing device.

10. The method of claim 1, wherein the user interface provides a list of rule components, the rule components being selectable by a user to (i) create for the program a new rule that includes one or more rule components selected by the user or (ii) alter an existing rule for the program by altering the existing rule to include one or more rule components selected by the user.

11. The method of claim 1, wherein the user interface includes one or more filter controls configured to filter a set of rules for the program according to user-selected criteria; and
   wherein the user interface provides a user-selectable list of rules that are associated with the user-selected criteria of the one or more filter controls.

12. The method of claim 1, wherein providing the configuration interface comprises providing an interface that enables a user to create a new rule for the program by selecting a combination of elements from among:
   first user interface elements indicating a plurality of triggers;
   second user interface elements indicating a plurality of conditions; and
   third user interface elements indicating a plurality of system actions;
   wherein receiving the data through the configuration interface comprises receiving data indicating user selections of one of first user interface elements indicating the plurality of triggers, one of second user interface elements indicating the plurality of conditions, and one of the third user interface elements indicating the plurality of system actions.

13. The method of claim 1, comprising:
   obtaining, by the one or more computers, data indicating received activity data that has satisfied one or more triggers or conditions of rules of the program over a particular period of time;
   providing, through the configuration interface, a list of rules that are identified based on the received activity data; and
   adding, based on a user selection from the list, a selected rule from the list to the program.

14. The method of claim 1, comprising providing the configuration interface to client devices of administrators that are each associated with a different organization; and
   using input from the respective client devices of the administrators to create or adjust programs for the respective organizations, each of the programs being provided by the one or more computers and being configured to provide interactions through the software application.

15. The method of claim 1, wherein the one or more criteria of the at least one rule are used to determine adherence with respect to a treatment for a health condition.

16. The method of claim 1, wherein the one or more criteria of the at least one rule are configured to evaluate whether performance of a user satisfies one or more performance goals specified for the user.

17. The method of claim 1, wherein the method includes providing, by the one or more computers, the generated program data to each of multiple client devices over the communication network, each of the client devices being associated with a different user, wherein the generated program data is configured to cause the software application on the respective client devices to selectively perform the particular action according to the one or more criteria of the at least one rule.

18. The method of claim 1, comprising using historical information indicating user activity to determine scores for different rules, the scores indicating effects that the respective rules are estimated to have on future user activity in the program; and based scores for the different rules, determining a configuration of rules predicted to improve a measure of user activity for the program.

19. The method of claim 1, wherein the particular action comprises transmission of data from a client device to another device.

20. The method of claim 1, wherein the particular action comprises providing, to a healthcare provider, data indicating health status of a user or adherence to treatment by a user.

21. The method of claim 1, wherein the particular action comprises initiating interaction with a user.

22. The method of claim 1, wherein the particular action comprises initiating interaction with a user with a prompt for the user to complete a survey.

23. A system comprising:
one or more computers; and
one or more computer-readable media storing instructions that are operable, when executed by the one or more computers, to cause the one or more computers to perform operations comprising:
providing, by the one or more computers, a configuration interface having functionality to define rules of a program that affect how the program interacts with users enrolled in the program, the program being configured to provide interactions with users through a software application on client devices of users enrolled in the program, wherein the configuration interface enables rule adjustment for the program through a user interface that includes interactive elements to define a new rule for the program or change an existing rule for the program, wherein the interactive elements enable selection or specification of at least one of (i) a trigger for initiating processing of a rule, (ii) an action for a server system or client device to perform based on the rule, or (iii) a requirement for a condition to be satisfied in order to perform the action based on the rule;
receiving, by the one or more computers and through the configuration interface, program configuration data indicating one or more rules for the program that are specified using the configuration interface, wherein at least one rule of the one or more rules includes one or more criteria for selectively performing a particular action based on at least one of (i) a physiological measure or (ii) user behavior other than user interface interactions;
generating, by the one or more computers, program data for the program based on the one or more rules specified by the program configuration data, wherein the generated program data includes the at least one rule and is configured to cause the software application to selectively perform the particular action based on at least one of (i) the physiological measure or (ii) the user behavior; and
providing, by the one or more computers, the generated program data to a particular client device over a communication network, wherein the generated program data is configured to cause the software application on the particular client device to interact with a user of the particular client device according to the one or more rules of the program, wherein the generated program data specifies the one or more rules of the program in a manner that enables the software application to determine whether the one or more criteria for performing the particular action associated with the at least one rule have been satisfied for the user of the particular client device.

24. The system of claim 23, wherein the operations comprise:
storing data defining each of multiple different programs that are configured to interact with different users through the software application, each of the multiple different programs having different sets of rules specified using the configuration interface; and
providing, by the one or more computers, program data for the multiple different programs to different client devices of the different users enrolled in the respective programs.

25. One or more non-transitory computer-readable media storing instructions that are operable, when executed by one or more computers, to cause the one or more computers to perform operations comprising:
providing, by the one or more computers, a configuration interface having functionality to define rules of a program that affect how the program interacts with users enrolled in the program, the program being configured to provide interactions with users through a software application on client devices of users enrolled in the program, wherein the configuration interface enables rule adjustment for the program through a user interface that includes interactive elements to define a new rule for the program or change an existing rule for the program, wherein the interactive elements enable selection or specification of at least one of (i) a trigger for initiating processing of a rule, (ii) an action for a server system or client device to perform based on the rule, or (iii) a requirement for a condition to be satisfied in order to perform the action based on the rule;
receiving, by the one or more computers and through the configuration interface, program configuration data indicating one or more rules for the program that are specified using the configuration interface, wherein at least one rule of the one or more rules includes one or more criteria for selectively performing a particular action based on at least one of (i) a physiological measure or (ii) user behavior other than user interface interactions;
generating, by the one or more computers, program data for the program based on the one or more rules specified by the program configuration data, wherein the generated program data includes the at least one rule and is configured to cause the software application to selectively perform the particular action based on at least one of (i) the physiological measure or (ii) the user behavior; and
providing, by the one or more computers, the generated program data to a particular client device over a communication network, wherein the generated program data is configured to cause the software application on the particular client device to interact with a user of the particular client device according to the one or more rules of the program, wherein the generated program data specifies the one or more rules of the program in a manner that enables the software application to determine whether the one or more criteria for performing the particular action associated with the at least one rule have been satisfied for the user of the particular client device.

* * * * *